(12) United States Patent
Yoshimura

(10) Patent No.: US 8,265,401 B2
(45) Date of Patent: Sep. 11, 2012

(54) IMAGE COMPRESSING APPARATUS, IMAGE COMPRESSING METHOD, IMAGE DECOMPRESSING APPARATUS, IMAGE DECOMPRESSING METHOD, IMAGE FORMING APPARATUS AND RECORDING MEDIUM

(75) Inventor: Hideyoshi Yoshimura, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 219 days.

(21) Appl. No.: 12/822,834

(22) Filed: Jun. 24, 2010

(65) Prior Publication Data
US 2010/0329548 A1 Dec. 30, 2010

(30) Foreign Application Priority Data
Jun. 25, 2009 (JP) ................ 2009-151206

(51) Int. Cl.
G06K 9/36 (2006.01)
G06K 9/38 (2006.01)
(52) U.S. Cl. .............. 382/232; 382/166; 382/173
(58) Field of Classification Search .......... 382/232–253, 382/173, 176, 166; 358/1.2, 1.9, 539–540, 358/426.01–426.16, 464, 3.24
See application file for complete search history.

(56) References Cited

U.S. PATENT DOCUMENTS

| | | | |
|---|---|---|---|
| 5,586,200 A * | 12/1996 | Devaney et al. | 382/232 |
| 6,701,020 B2 * | 3/2004 | Chrysafis et al. | 382/239 |
| 7,536,055 B2 * | 5/2009 | Ogawa | 382/232 |
| 7,639,880 B2 | 12/2009 | Hasegawa et al. | |
| 8,045,801 B2 * | 10/2011 | Kanatsu | 382/176 |
| 8,121,417 B2 * | 2/2012 | Gering et al. | 382/232 |
| 2007/0053602 A1 * | 3/2007 | Kanatsu | 382/244 |
| 2008/0175475 A1 * | 7/2008 | Sung | 382/173 |
| 2009/0296157 A1 * | 12/2009 | Misawa et al. | 358/3.24 |

FOREIGN PATENT DOCUMENTS

| | | |
|---|---|---|
| JP | 3-104380 A | 5/1991 |
| JP | 2000-184205 A | 6/2000 |
| JP | 2003-158739 A | 5/2003 |
| JP | 2003-244447 A | 8/2003 |
| JP | 2006-238405 A | 9/2006 |
| JP | 2009-17317 A | 1/2009 |

* cited by examiner

Primary Examiner — Ishrat I Sherali
(74) Attorney, Agent, or Firm — Birch, Stewart, Kolasch & Birch, LLP

(57) ABSTRACT

When compressing continuous tone bit map image data, the image compression section of the image compressing apparatus segments the continuous tone bit map image data into bit map image data for lossy compression, index image data for lossless compression and bit map image data for lossless compression based on pixel identification information data. The lossy compression section of the image compression section performs lossy compression process according to the JPEG method for the bit map image data for lossy compression, and the first lossless compression section thereof performs lossless compression process according to the JBIG method for the index image data for lossless compression. Furthermore, the second lossless compression section thereof performs lossless compression process according to the JPEG-LS method for the bit map image data for lossless compression.

12 Claims, 16 Drawing Sheets

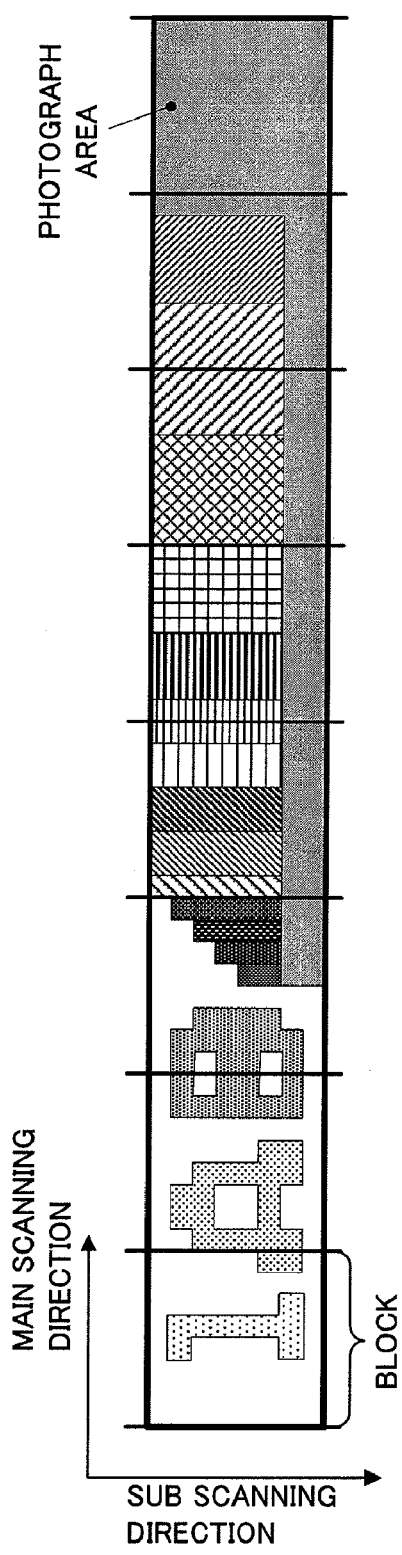
FIG. 7A CONTINUOUS TONE BIT MAP IMAGE DATA
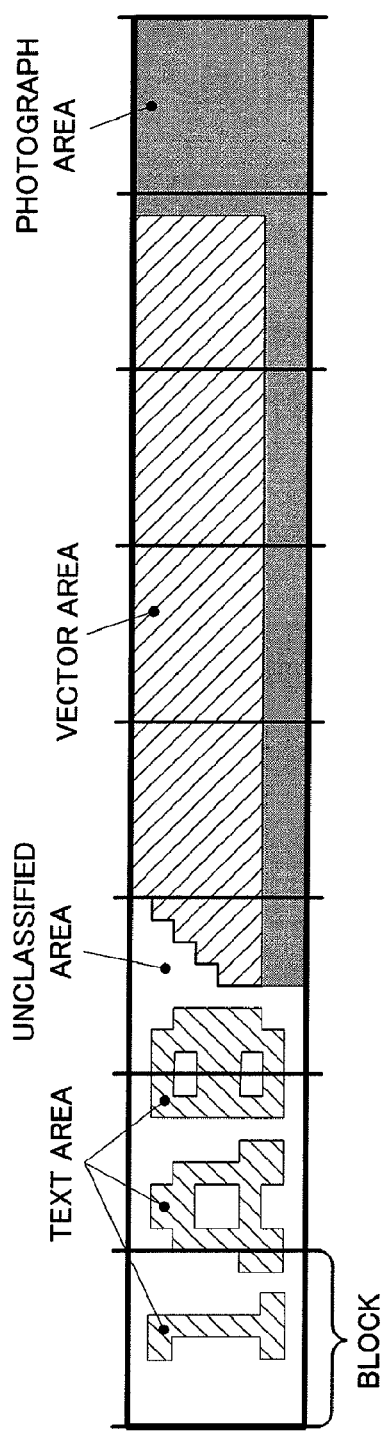
FIG. 7B PIXEL IDENTIFICATION INFORMATION DATA

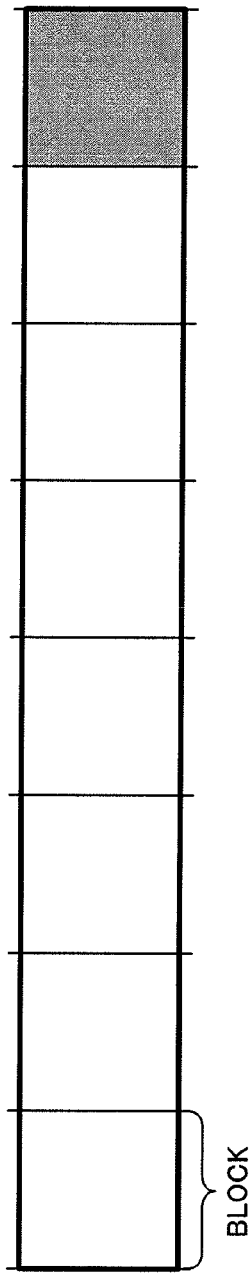
FIG. 8A  BIT MAP IMAGE DATA FOR LOSSY COMPRESSION
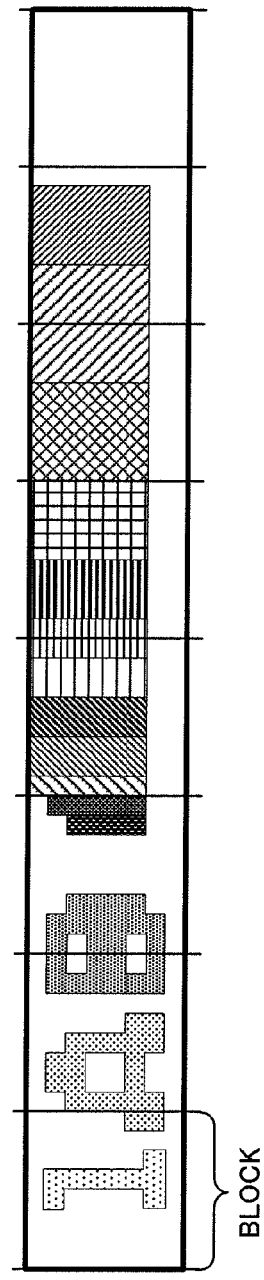
FIG. 8B  INDEX IMAGE DATA FOR LOSSLESS COMPRESSION
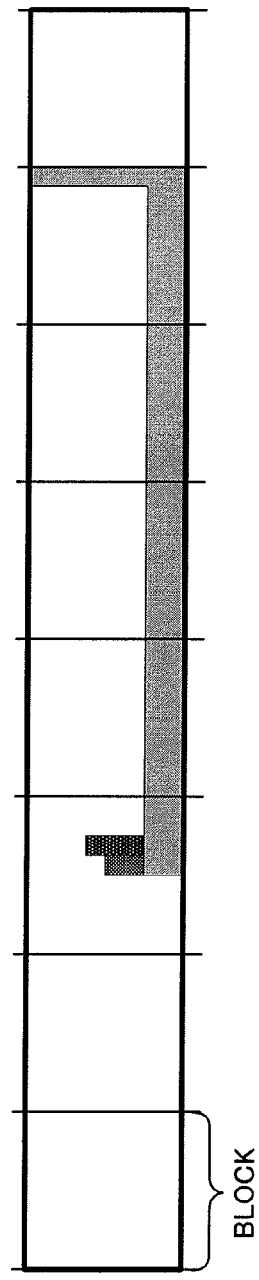
FIG. 8C  BIT MAP IMAGE DATA FOR LOSSLESS COMPRESSION

F I G. 1 4

| SAMPLE SET | TOTAL NUMBER OF PIXELS A | LOSSLESS COMPRESSION TARGET RATIO B(%) | INDEX IMAGE COVERING RATIO C(%) | TOTAL NUMBER OF BYTES OF LOSSLESS COMPRESSION DATA D | TOTAL NUMBER OF BYTES OF JPEG-LS COMPRESSED DATA E | LOSSLESS COMPRESSION PROGRESS RATE F |
|---|---|---|---|---|---|---|
| TEST SET1 (12SAMPLES) | 389215680 | 51.6 | 94.6 | 7183575 | 14764287 | 2.1 |
| TEST SET2 (20SAMPLES) | 648692800 | 76.7 | 99.5 | 5506310 | 12156749 | 2.2 |
| TEST SET3 (12SAMPLES) | 423013120 | 82.7 | 99.6 | 3744678 | 16011777 | 4.3 |

IMAGE COMPRESSING APPARATUS, IMAGE COMPRESSING METHOD, IMAGE DECOMPRESSING APPARATUS, IMAGE DECOMPRESSING METHOD, IMAGE FORMING APPARATUS AND RECORDING MEDIUM

CROSS-REFERENCE TO RELATED APPLICATIONS

This Nonprovisional application claims priority under 35 U.S.C. §119(a) on Patent Application No. 2009-151206 filed in Japan on Jun. 25.2009, the entire contents of which are hereby incorporated by reference.

BACKGROUND

1. Technical Field

The present invention relates to an image compressing apparatus and an image compressing method for compressing an image, an image decompressing apparatus and an image decompressing method for decompressing a compressed image, an image forming apparatus, and a recording medium.

2. Description of Related Art

Apparatuses having a printing function, such as those referred to as a monofunctional printer or a multifunctional printer, have been widely used. Such a printing apparatus generally receives image information for forming an output image from an external personal computer (hereafter referred to as a PC) or the like via a wired or wireless communication path, forms an output image by performing conversion process suited for the apparatus itself and prints the image on paper. Furthermore, generally speaking, the printing apparatus receives image information from an external device in a format referred to as PDL (a page description language) or in a specific format, i.e., in a format represented by a form close to that of the output image peculiar to the apparatus.

The PDL format is a format defined to provide versatility so that printing can be accomplished by various printers without causing the user to be aware of the characteristics of the printing apparatuses as much as possible. As an example of PDL, PostScript developed by Adobe Systems Incorporated is available for example. On the other hand, such a specific format is frequently used to reduce the load on the side of a printing apparatus or on the side of an image information sender although versatility is reduced, and various specific formats are available.

The following will explain process for receiving PDL data written in PDL and performing printing by a conventional printer. FIG. 1 is a block diagram showing the internal configuration of the conventional printer. The conventional printer 501 transmits and receives information to and from an external PC 500 via a wired or wireless communication path 500a, such as a USB (universal serial bus) cable or a wireless LAN (local area network).

The printer 501 obtains PDL data (image information) from the external PC 500 via the communication path 500a. The PDL data input to the printer 501 is subjected to RIP process by an RIP (raster image processor) process section 502. In the RIP process, the input PDL data is interpreted according to PDL language specifications and continuous tone bit map image data is generated. Since a print output format conversion process section 503 performs pseudo tone reproduction using density gradation that can be reproduced by a print engine 504, the continuous tone bit map image data is subjected to tone reproduction process using image process, such as a dither method and an error diffusion method and then converted into halftone bit map image data.

The halftone bit map image data is input to the print engine 504 equipped with an electrophotographic type or ink-jet type printing section. The print engine 504 performs printing on paper according to the input halftone bit map image data. The RIP process section 502 and the print output format conversion process section 503 are constituted by a processor or an ASIC (application specific integrated circuit) (both are not shown) mounted in the printer 501 or a combination of these, for example.

Some type of the printer 501 is configured so that a plurality of print outputs can be performed for the same PDL data. The printer 501 capable of performing a plurality of print outputs stores image data therein in any one of image formats, such as a format received from the external PC 500, an intermediate format obtained by converting the received format or a format according to a final output image format. In addition, the printer 501 performs a plurality of print outputs using the stored image data, thereby attaining a function capable of performing a plurality of print outputs using image data obtained by performing input process once.

On storing image data in the format received from the external PC 500, the amount of process at the time of the reception is small, but the amount of process at the time of printing is large. On the other hand, on storing image data in the format according to the final output image format, the amount of process at the time of the reception is large, but the amount of process at the time of printing is small. On storing image data in the intermediate format, the amount of process is intermediate therebetween. In order to shorten the time required to perform a plurality of print outputs, it is efficient to perform the process of the RIP process section 502 and the print output format conversion process section 503 only once and to store and reuse the result in the format according to the final output image format.

In addition, on storing image data in the format according to the intermediate format or the final output image format, a data storage capacity per page is generally reduced by data compression. This is based on the facts that the amount of image data to be printed out is generally large and that when the image data is bit map data, a relatively large compression rate can be expected. Hence, it is frequently advantageous that system loads, such as the data storage capacity and bus bandwidth, increasing when the image data is processed without compression, can be reduced, even in consideration of the overhead for data compression and data decompression.

FIG. 2 is a block diagram showing the internal configuration of another conventional printer. Components similar to those shown in FIG. 1 are designated by the same numerals and their descriptions are omitted. When the printer 501 shown in FIG. 1 stores image data therein on performing a plurality of print outputs for the same PDL data, the configuration shown in FIG. 2 in which halftone bit map image data is compressed and stored is used efficiently.

In the printer 501 shown in FIG. 2, a halftone image compressor 505 compresses the halftone bit map image data that has been converted from the continuous tone bit map image data by the print output format conversion process section 503. The compressed image data is stored in a storage section 506 constituted by a hard disk or a flash ROM (read only memory). The compressed image data stored in the storage section 506 is decompressed by a halftone image decompressor 507, returned to the halftone bit map image data and input to the print engine 504.

Since the halftone image compressor 505 and the halftone image decompressor 507 are used to process halftone images, an image compressing method being effective in compressing halftone images is used. An example to be used is JBIG (a binary image lossless compression method decided by Joint Bi-level Image Experts Group, ITU-T recommendation T.82) or JBIG2 (a compression method for lossless compression or lossy compression for images ranging from binary images to multilevel images, decided by Joint Bi-level Image Experts Group 2, ITU-T recommendation T.88), recommended by Telecommunication Standardization Sector (ITU-T) of ITU (International Telecommunication Union).

Furthermore, some type of the printer 501 (a multifunctional printer) is configured so as to be able to perform print output, external output, facsimile transmission (hereafter referred to as FAX transmission), etc. for image data stored inside the printer 501 according to the user's request so that the image data can be reused. FIG. 3 is a block diagram showing the internal configuration of still another conventional printer. Components similar to those shown in FIGS. 1 and 2 are designated by the same numerals and their descriptions are omitted.

As shown in FIG. 3, since the printer 501 capable of performing plural types of process for the stored image data has a plurality of output destinations to which the stored image data is output, it is preferable that the image data is stored in an intermediate format so that the image data can be converted into various kinds of formats depending on output destination. FIG. 3 shows a configuration in which continuous tone bit map image data is compressed and stored. In other words, in the printer 501 shown in FIG. 3, the continuous tone bit map image data generated from the PDL data by the RIP process section 502 is compressed by a continuous tone image compressor 508 and then stored in the storage section 506.

The compressed image data stored in the storage section 506 is decompressed by a continuous tone image decompressor 509 and returned to the continuous tone bit map image data and then input to any one of the print output format conversion process section 503, a JPEG format conversion process section 510 and a FAX format conversion process section 512. More specifically, when the user requests printing through the operation section (not shown) of the printer 501, the continuous tone bit map image data is input to the print output format conversion process section 503. In addition, when the user requests image transmission in the JPEG (an image compression method for lossy compression or lossless compression of multilevel images, decided by Joint Photographic Experts Group, ITU-T recommendation T.81) format, the continuous tone bit map image data is input to the JPEG format conversion process section 510. Furthermore, when the user requests FAX transmission, the continuous tone bit map image data is input to the FAX format conversion process section 512.

The continuous tone bit map image data input to the print output format conversion process section 503 is converted into halftone bit map image data by the print output format conversion process section 503 and printed out onto paper by the print engine 504. The continuous tone bit map image data input to the JPEG format conversion process section 510 is converted into JPEG image data by the JPEG format conversion process section 510 and is transmitted to a destination via a network transmission section 511 capable of performing communication with an external network. The continuous tone bit map image data input to the FAX format conversion process section 512 is converted into FAX transmission format image data by the FAX format conversion process section 512 and is transmitted to a destination via a FAX transmission section 513 that has an interface for FAX and a communication function.

The JPEG format conversion process section 510 and the FAX format conversion process section 512 are constituted by a processor or an ASIC mounted in the printer 501 or a combination of these, for example.

The halftone bit map image data for print output, the JPEG image data for image transmission and the FAX transmission format image data for FAX transmission are different from each other in format. Hence, when the respective formats of image data are created in advance and stored inside the printer 501, the required process capability and the amount of data to be created increase. Furthermore, when either format of image data is stored inside the printer 501 and reused after format conversion, image quality is degraded.

Hence, the configuration in which image data of the continuous tone bit map format serving as an intermediate format convertible into any format is compressed and stored as shown in FIG. 3, instead of storing the image data in the respective formats, is convenient in view of process capability, the amount of data and data management. However, when the continuous tone image compressor 508 compresses the continuous tone bit map image data completely by performing lossless compression process, the rate of the compression is limited depending on the continuous tone bit map image data, and only a compression rate limited to some extent is obtained, although no difference occurs in image quality between before and after the image compression.

In recent years, various kinds of methods have been proposed as image compression methods for multilevel images. Examples of the methods include lossless compression methods that use one-dimensional auto-correlation, such as a compression method based on the run-length method, the LZW method based on the Lempel-Ziv method serving as a lexicographic compression method, and the DEFLATE method. Furthermore, the ITU-T Recommendation stipulates the JPEG lossy compression method based on DCT (discrete cosine transform), including image compression method information for reference to the definition of the image decompressing method. Moreover, Lossless JPEG (ITU-T Recommendation T.81, Annex H) stipulates a lossless compression method based on two-dimensional DPCM (differential pulse code modulation). Still further, JPEG-LS (ITU-T Recommendation T.87) and JPEG 2000 (ITU-T Recommendation T.800) respectively stipulate a lossless compression method and a lossy compression method in which methods different from each other are used. These methods are used widely.

Some types of apparatuses, such as a digital copier and a multifunctional printer, have a scanner function for optically reading a document placed on a document table and generating digital image data of the read image. Since this type of apparatus reads the document optically, the digital image data contains noise and errors caused by a light source and a reading device. Furthermore, since the optical resolution is limited, edges and the like cannot be reproduced, and the digital image data generated by the scanner function cannot reproduce the document completely. For this reason, when an image generated using the scanner function is compressed, the lossy compression method defined in JPEG or JPEG 2000 is generally used frequently.

On the other hand, various kinds of image data, such as text images of texts, characters and the like, vector images, such as ruled lines and graphics in graphs, and photograph images in which image data taken using a digital camera or the like are pasted partly, are mixed in continuous tone bit map image data that is generated electronically from PDL data using a method, such as the RIP process. Among the various kinds of image data, text images and vector images generally have relatively small numbers of colors and gray scales. Since the resolution of the visual sense of the human is high in low gray scales, blurs at edges caused by lossy compression are easily recognized as degradation in image quality. Hence, text images and vector images should not be subjected to lossy compression if possible. Furthermore, since text images and vector images generally have small numbers of colors, the compression rates can be improved easily even when lossless compression is performed.

Moreover, since photograph images, such as originally image-sensed images, represented using relatively large numbers of colors and gray scales have a large number of colors, when such images are subjected to lossless compression, the compression rates thereof are not expected to be improved. However, the resolution of the visual sense of the human is low in multiple gray scales, and some differences in photograph images cannot be distinguished. Hence, photograph images are suited for lossy compression that can further reduce the amount of data although the compression is lossy compression. For this reason, with respect to continuous tone bit map image data, it can be expected that the image quality equivalent to that obtained before the compression can be maintained by using lossless compression and lossy compression in combination, while the compression rate is improved.

For example, a method has been proposed in which a color image is segmented into plural kinds of portions, such as text portions and halftone portions or texts, graphics and images, and the respective portions are subjected to appropriate encoding process (image compression) (refer to Japanese Patent Application Laid-open No. H03-104380 (1991) and Japanese Patent Application Laid-open No. 2000-184205). In addition, an apparatus has been proposed in which input image data is segmented into areas having different numbers of gray scales, and one area is encoded using a reversible encoding method and the other is encoded using irreversible encoding method (refer to Japanese Patent Application Laid-open No. 2003-158739).

SUMMARY

However, when a multifunctional printer segments an image into a photograph area suited for lossy compression based on the information written in PDL and performs lossy compression for the photograph area and performs lossless compression for the remaining image area into which text and vector images are segmented, there occurs a problem when image quality is balanced with compression rate. For example, the image compressor and the image decompressor of the multifunctional printer are desired to have a throughput of not less than a constant level, as a printer function, to satisfy printing performance and to receive print information input from an external device at a constant level of performance.

Although various lossless compression means are available, when the throughput in compression process and decompression process is constant, the amount of process resources required for lossless compression is generally not proportional to the compression rate but increases abruptly as the compression rate rises while a value determined by the amount of data to be compressed is used as a theoretical upper limit of the compression rate. The process resources include the amount of calculation, process steps, the amount of storage, etc. and are equivalent to the circuit size of hardware. In other words, if lossless compression process is simplified, the process resources required for a constant throughput can be reduced, but the obtained compression rate becomes relatively low. On the other hand, if complicated lossless compression process is used, the amount of the process resources required for a constant throughput becomes relatively large, but the obtained compression rate can be made closer to the theoretical upper limit.

In the above-mentioned JPEG, Lossless JPEG, JPEG-LS, JPEG 2000, etc., after data compression methods using two-dimensional image correlations peculiar to the respective types of compression process are performed, entropy coding is performed and two-step data compression is performed. With respect to Huffman coding and arithmetic coding serving as typical entropy coding, it is known that the arithmetic coding can generally attain a higher compression rate than the Huffman coding; on the other hand, if compression rates approximately equal to each other are assumed and the arithmetic coding and the Huffman coding are compared at the same throughput, it is known that the arithmetic coding requires more amount of process resources than the Huffman coding.

On the other hand, an image area to be subjected to lossless compression contains text and vector images. Since the numbers of texts, lines, etc. and the number of usable colors in these images are not limited, it is possible to attain all data representations for multilevel input images. For this reason, lossless compression process is required to be able to compress multilevel input images themselves. However, with respect to the Huffman coding and the arithmetic coding, in the case of an adaptive encoding method in which a generated code is changed particularly depending on the input to be encoded, when the compression rate and the throughput are constant, it is known that depending on the value range (dynamic range) to be compressed, the required amount of the process resources increases abruptly according to the power law or at an exponential rate, instead of a linear functional increase.

For the above-mentioned reasons, it is difficult to simultaneously attain a throughput higher than a constant level, a high image compression rate and a reduced amount of resources required for process while the wide value range of an input image is secured. Excellent lossless compression methods capable of attaining these simultaneously have not yet been found at present in any documents including Japanese Patent Application Laid-open No. H03-104380 (1991), Japanese Patent Application Laid-open No. 2000-184205 and Japanese Patent Application Laid-open No. 2003-158739.

The present invention has been made with the aim of solving the above problems, and it is an object of the invention to provide an image compressing apparatus and an image compressing method capable of efficiently performing compression process at a high compression rate while degradation in image quality is reduced by using lossy compression process and a plurality of different types of lossless compression process in combination, to provide an image decompressing apparatus and an image decompressing method capable of efficiently performing decompression process for the image compressed using the lossy compression process and the plurality of different types of lossless compression process, and to an image forming apparatus and a recording medium.

An image compressing apparatus according to the present invention is an image compressing apparatus for compressing an input image having a plurality of color components, comprising: a first image segmentation section for segmenting said input image into a image for lossless compression to be subjected to lossless compression and a image for lossy compression to be subjected to lossy compression, based on pixel identification information indicating that respective pixels constituting said input image belong to which of a plurality of areas including a text area and a photograph area; a color determination section for determining color information that is used when said image for lossless compression is further segmented; a second image segmentation section for segmenting said image for lossless compression segmented by said first image segmentation section into a first image for lossless compression containing said color information determined by said color determination section and one or a plurality of second images for lossless compression excluding said first image for lossless compression; and an image compression section for performing respectively different compression process for each of said image for lossy compression segmented by said first image segmentation section, said first image for lossless compression and said second image for lossless compression segmented by said second image segmentation section.

An image compressing apparatus according to the present invention is characterized by further comprising: a frequency distribution generating section for generating frequency distribution of color information of respective pixels constituting said image for lossless compression based on said image for lossless compression, wherein said color determination section determines the color information indicating a predetermined number of colors whose frequency of occurrence is higher, based on the frequency distribution generated by said frequency distribution generating section.

An image compressing apparatus according to the present invention is characterized in that said color determination section determines the color information for respective predetermined areas in said input image.

An image compressing apparatus according to the present invention is characterized in that said first image segmentation section segments said input image into said image for lossless compression and said image for lossy compression according to a predetermined condition.

An image compressing apparatus according to the present invention is characterized in that said second image segmentation section generates said first image for lossless compression by replacing a pixel value of a pixel included in a pixel constituting said image for lossless compression segmented by said first image segmentation section and segmented into said second image for lossless compression with a pixel value indicating a transparent color.

An image compressing method according to the present invention is an image compressing method for compressing an input image having a plurality of color components, comprising: a first image segmentation step for segmenting said input image into a image for lossless compression to be subjected to lossless compression and a image for lossy compression to be subjected to lossy compression, based on pixel identification information indicating that respective pixels constituting said input image belong to which of a plurality of areas including a text area and a photograph area; a color determination step for determining color information that is used when said image for lossless compression is further segmented; a second image segmentation step for segmenting said image for lossless compression segmented at said first image segmentation step into a first image for lossless compression containing said color information determined at said color determination step and one or a plurality of second images for lossless compression excluding said first image for lossless compression; and an image compression step for performing respectively different compression process for each of said image for lossy compression segmented by said first image segmentation step, said first image for lossless compression and said second image for lossless compression segmented by said second image segmentation step.

An image decompressing apparatus according to the present invention is an image decompressing apparatus for decompressing a compressed image, comprising: an image decompression section for performing respectively different decompression process for a lossy compression image subjected to lossy compression after segmented from one image, and a plurality of lossless compression images each subjected to different types of lossless compression after segmented from said one image; and an image composing section for composing a plurality of images obtained by performing the different types of decompression process by said image decompression section, by superimposing the plurality of images in a predetermined sequence.

An image decompressing method according to the present invention is an image decompressing method for decompressing a compressed image, comprising: an image decompression step for performing respectively different decompression process for a lossy compression image subjected to lossy compression after segmented from one image, and a plurality of lossless compression images each subjected to different types of lossless compression after segmented from said one image; and an image composing step for composing a plurality of images obtained by performing the different types of decompression process at the image decompression step, by superimposing the plurality of images in a predetermined sequence.

An image forming apparatus according to the present invention is an image forming apparatus comprising: the above-mentioned image decompressing apparatus; and an image forming section for forming an output image based on an image processed by said image decompressing apparatus.

An image forming apparatus according to the present invention is an image forming apparatus comprising: any one of the above-mentioned image compressing apparatus; the above-mentioned image decompressing apparatus; and an image forming section for forming an output image based on the image processed by said image decompressing apparatus, wherein said image decompressing apparatus performs decompression process for an image compressed by said image compressing apparatus.

A recording medium according to the present invention is a recording medium on which a computer program for causing a computer to perform compression process for an input image having a plurality of color components are recorded so as to be readable by said computer, said computer programs comprising:
a first image segmentation step for causing said computer to segment said input image into a image for lossless compression to be subjected to lossless compression and a image for lossy compression to be subjected to lossy compression, based on pixel identification information indicating that respective pixels constituting said input image belong to which of a plurality of areas including a text area and a photograph area; a color determination step for causing said computer to determine color information that is used when said image for lossless compression is further segmented; a second image segmentation step for causing said computer to segment said image for lossless compression segmented at said first image segmentation step into a first image for lossless compression containing said color information determined at said color determination step and one or a plurality of second images for lossless compression excluding said first image for lossless compression; and an image compression step for causing said computer to perform respectively different compression process for each of said image for lossy compression segmented by said first image segmentation step, said first image for lossless compression and said second image for lossless compression segmented by said second image segmentation step.

A recording medium according to the present invention is a recording medium on which computer programs for causing a computer to perform decompression process for a compressed image are recorded so as to be readable by said computer, said computer programs comprising: an image decompression step for causing said computer to perform respectively different decompression process for a lossy compression image subjected to lossy compression after segmented from one image, and a plurality of lossless compression images each subjected to different types of lossless compression after segmented from said one image; and an image composing step for causing said computer to compose a plurality of images obtained by the different types of decompression process at said image decompression step by superimposing the plurality of images in a predetermined sequence.

In the present invention, an input image is segmented into a image for lossless compression and image for a lossy compression based on the pixel identification information of respective pixels constituting the input image. In addition, the image for lossless compression is segmented into a first image for lossless compression containing predetermined color information and one or a plurality of second images for lossless compression excluding the first image for lossless compression. Different types of compression process are performed for the segment image for lossy compression, first image for lossless compression and second image for lossless compression. In other words, the input image is segmented into areas respectively suited for lossless compression and lossy compression, and lossless compression or lossy compression is performed for each area, whereby efficient compression process can be performed. Furthermore, the image for lossless compression is segmented into the first image for lossless compression containing the predetermined color information and the second image for lossless compression other than the first image for lossless compression, and different types of lossless compression are performed for the first and second images for lossless compression, whereby more efficient compression process can be performed.

In the present invention, the color information that is used when the image for lossless compression is segmented into the first image for lossless compression and the second image for lossless compression other than the first image for lossless compression is determined based on the frequency distribution of the color information of respective pixels contained in the image for lossless compression. The ratio of the first image for lossless compression in the lossless compression image can be raised by segmenting the image containing the color information appearing frequently into the first image for lossless compression. Hence, for example, when lossless compression process expected to provide a high compression rate is performed for the first image for lossless compression, a high compression rate can be attained. In addition, the first image for lossless compression can be prevented from increasing and efficient lossless compression can be attained by limiting the amount of the color information segmented into the first image for lossless compression to a predetermined number. More appropriate compression process can be performed by performing compression process for the first image for lossless compression and the second image for lossless compression in consideration of image compression rate and resources required for the compression process.

In the present invention, the color information according to which the image for lossless compression is segmented into the first image for lossless compression and the second image for lossless compression is made different for each predetermined area in the input image. Hence, even an input image having local areas in which different color information is used, a wider range in the image for lossless compression can be segmented into the first image for lossless compression. As a result, for example, when lossy compression process expected to provide a high compression rate is performed for the first image for lossless compression, a high compression rate can be attained, and efficient compression process can be attained.

In the present invention, the input image is segmented into a image for lossless compression and a image for lossy compression according to a preset condition. Hence, for example, when a predetermined condition is set and the entire input image is segmented into the image for lossless compression, the input image is reproduced only from the image for lossless compression, whereby the degradation in image quality before and after compression process can be prevented.

In the present invention, when the first image for lossless compression containing the predetermined color information is segmented from the image for lossless compression segmented from the input image, the pixel values of the pixels included in the pixels constituting the image for lossless compression and segmented into the second image for lossless compression are replaced with a pixel value indicating a transparent color. Hence, the first image for lossless compression and the second image for lossless compression are composed only by superimposing the first image for lossless compression on the second image for lossless compression, whereby the image for lossless compression can be restored easily.

In the present invention, after different types of decompression process are performed for the lossy compression image segmented from one image and subjected to lossy compression and for a plurality of lossless compression images compressed by different types of lossless compression process, the images are superimposed in a predetermined sequence so as to be composed. Hence, a decompressed image can be generated easily by decompressing and superimposing the compressed images, without requiring mask images or the like for the decompressed images.

According to the present invention, compression process can be performed efficiently at a high compression rate by combing lossless compression process with lossy compression process and also by combing a plurality of different types of lossless compression process with each other. In particular, compression process can be performed efficiently for an image having numerous objects, such as a text (a character), a graphic (diagram) and a photograph, while the reproducibility of edges and the reusability of the image are maintained. Furthermore, decompression process can be performed efficiently for an image compressed using lossy compression process and a plurality of different types of lossless compression process.

The above and further objects and features will more fully be apparent from the following detailed description with accompanying drawings.

BRIEF DESCRIPTION OF THE SEVERAL VIEWS OF THE DRAWINGS

FIGS. 7A and 7B are schematic views for explaining process of segmenting continuous tone bit map image data;

FIGS. 8A, 8B and 8C are schematic views for explaining process of segmenting the continuous tone bit map image data;

FIG. 14 is a table showing the effects obtained when the present invention is applied;

DETAILED DESCRIPTION

An image compressing apparatus, an image compressing method, an image decompressing apparatus, an image decompressing method, an image forming apparatus, computer programs and a recording medium according to the present invention will be described below in detail based on the drawings showing the embodiments thereof.

Embodiment 1

Figure 1:
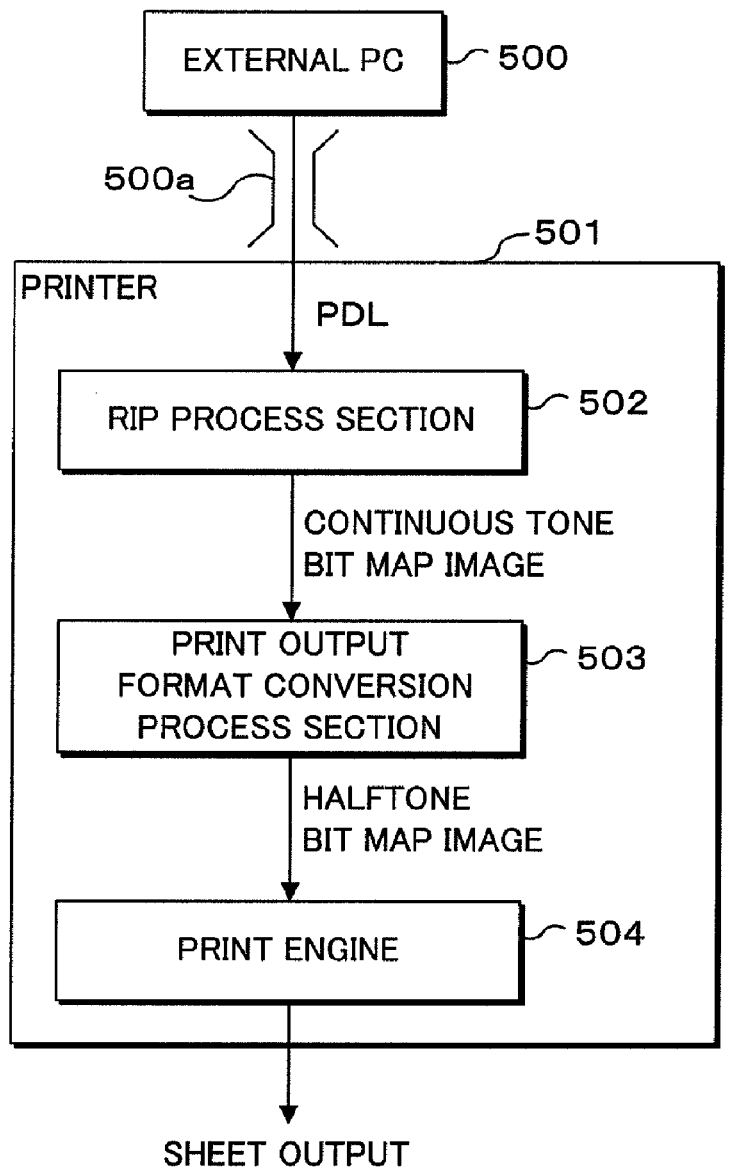
FIG. 1 is a block diagram showing the internal configuration of a conventional printer.
Figure 2:
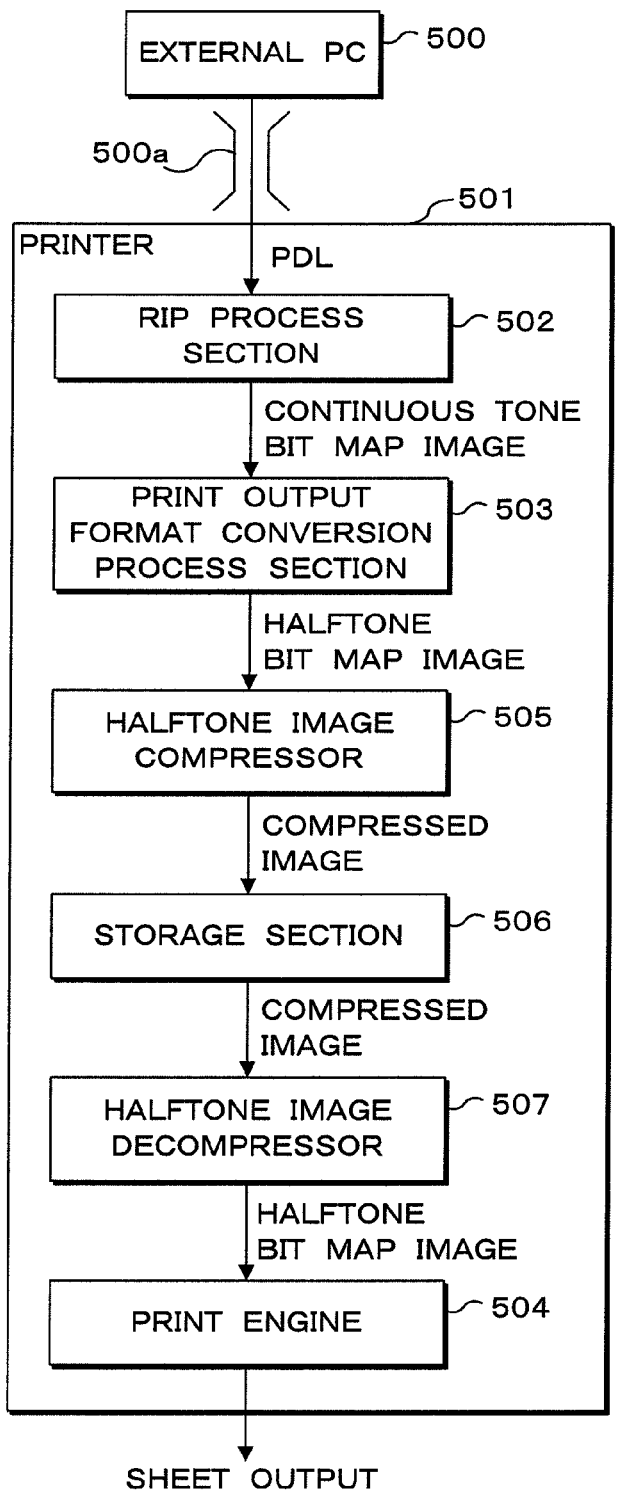
FIG. 2 is a block diagram showing the internal configuration of another conventional printer.
Figure 3:
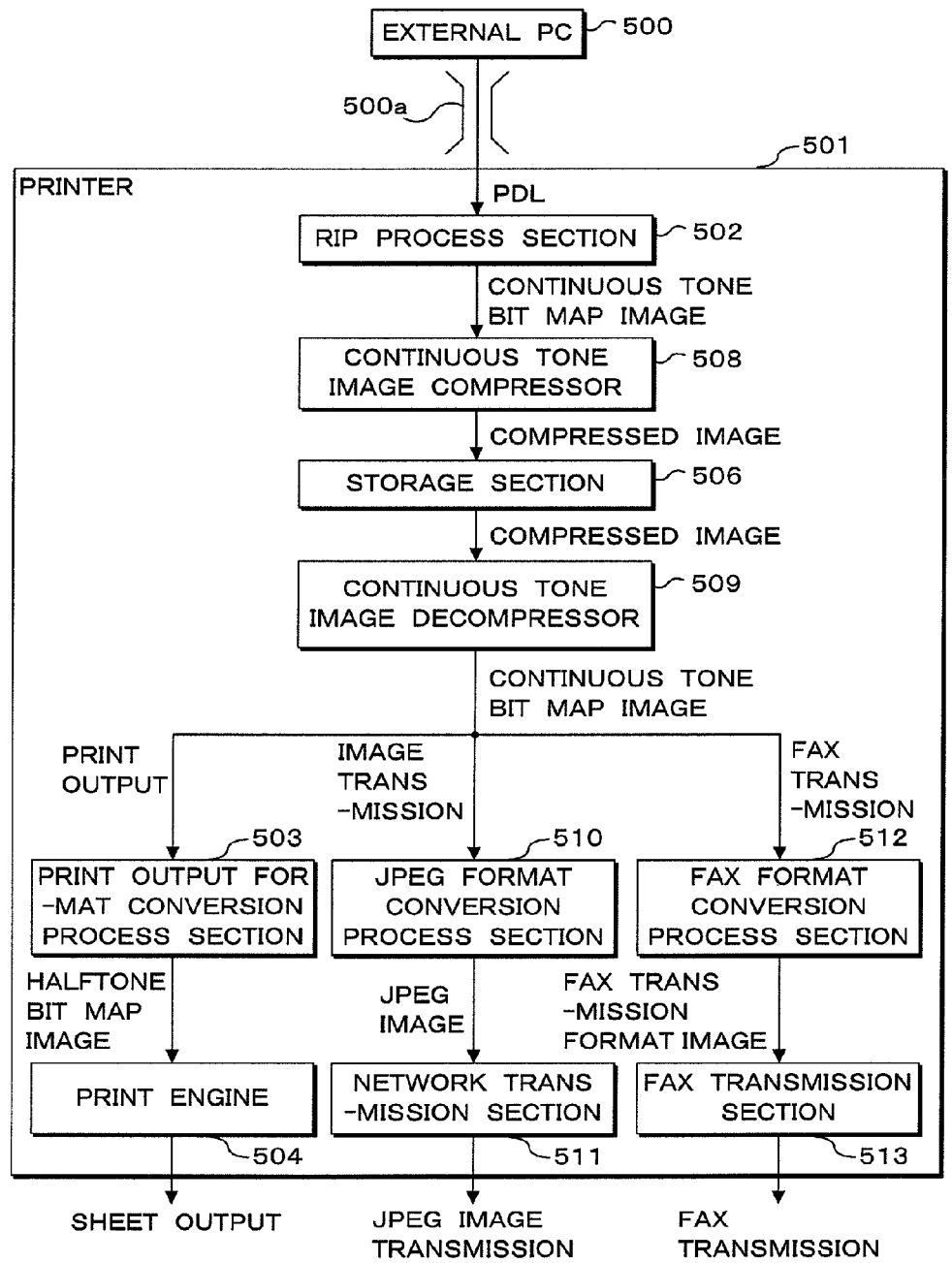
FIG. 3 is a block diagram showing the internal configuration of still another conventional printer.
Figure 4:
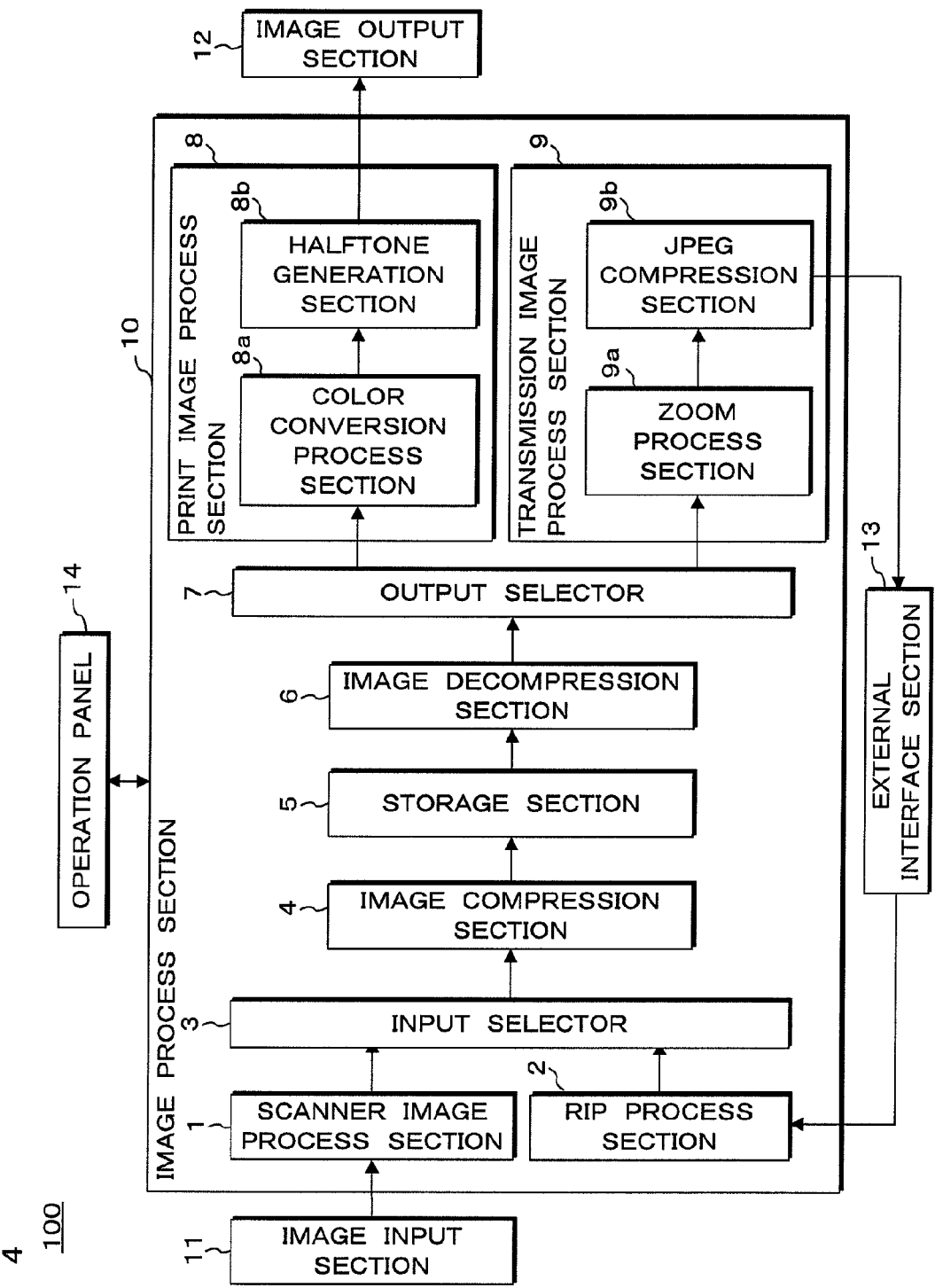
FIG. 4 is a block diagram showing the configuration of an image forming apparatus according to Embodiment 1.

An image forming apparatus according to Embodiment 1 will be described below. FIG. 4 is a block diagram showing the configuration of an image forming apparatus 100 according to Embodiment 1. The image forming apparatus 100 (for example, a digital color multi-function peripheral) according to Embodiment 1 is equipped with an image input section 11, an image process section 10, an image output section 12, an external interface section 13, an operation panel 14, etc. The operations of these components provided for the image forming apparatus 100 are controlled by a CPU (central process unit), not shown.

The image forming apparatus 100 performs predetermined image process for image data obtained from the image input section 11 or the external interface section 13 using the image process section 10. Furthermore, the image forming apparatus 100 outputs (prints) images based on the processed image data using the image output section 12 or outputs the processed image data to an external device from the external interface section 13.

The image input section 11 is a scanner equipped with a light source for irradiating reading light to a document, a CCD (charged coupled device) line sensor, etc. The image input section 11 converts the light reflected by the document into an analog R, G and B (R: red, G: green, B: blue) signal (RGB reflectivity signal). Since the CCD line sensor is used as an image sensing device, the image input section 11 reads a two-dimensional image by performing reading while the light source is used for scanning in a direction (sub scanning direction) orthogonal to the longitudinal direction (main scanning direction) of the CCD line sensor.

In addition, the image input section 11 has an A/D (analog/digital) converter. The image input section 11 performs A/D conversion process for the obtained analog image signal and converts the signal into an 8-bit digital image signal, for example. Hence, the image input section 11 generates scanner image data (raster data) having R, G and B color components and outputs the data to the image process section 10.

The image output section 12 is an electrophotographic type or ink-jet type printer (an image forming section). Based on the print image data received from the image process section 10, the image output section 12 forms an image on a sheet of recording paper or OHP film or the like, thereby outputting the image.

The operation panel 14 is equipped with an operation section for accepting operations, such as the setting of the operation mode of the image forming apparatus 100, a display section, such as a liquid crystal display, etc.

The external interface section 13 having a wired or wireless external connection function receives the PDL data from an external PC or the like via a wired or wireless communication path and outputs the data to the image process section 10. Furthermore, the external interface section 13 receives the transmission image data generated by the image process section 10 and transmits the data to the external PC or the like. In Embodiment 1, a configuration is described in which the external interface section 13 receives the PDL data written in PDL, such as PostScript, from the external PC or the like. However, the data is not limited to data according to the PDL format, but may be data specific to the image forming apparatus 100, for example, provided that the data is used to instruct the image forming apparatus 100 on printing process or transmission process.

The image process section 10 is equipped with a scanner image process section 1, an RIP process section 2, an input selector 3, an image compression section 4 (an image compressing apparatus), a storage section 5, an image decompression section 6 (an image decompressing apparatus), an output selector 7, a print image process section 8, a transmission image process section 9, etc.

The scanner image process section 1 performs shading correction process to eliminate various kinds of distortions caused in scanner image data input from the image input section 11 due to the configurations of the lighting system, the image focusing system, the image sensing system, etc. of the image input section 11. Furthermore, the scanner image process section 1 performs visual sensitivity correction using LUTs (look-up tables) prepared for the respective RGB signals to correct the difference between the sensitivity characteristics of the CCD line sensor serving as an image sensing device and the visual sensitivity characteristics of the human. The scanner image process section 1 supplies corrected scanner image data to the input selector 3. The corrected scanner image data has an image size determined depending on the output resolution and the output size of the image output section 12. Respective pixels of the scanner image data are represented by 256 gray scales in which each color component of RGB can be represented by 8 bits.

The RIP process section 2 interprets the PDL data input from the external PC or the like via the external interface section 13 according to the PDL language specifications and generates continuous tone bit map image data (raster data) having RBG color components. The continuous tone bit map image data has an image size determined depending on the output resolution and the output size of the image output section 12. Respective pixels of the continuous tone bit map image data are represented by 256 gray scales in which each color component of RGB can be represented by 8 bits.

Furthermore, the RIP process section 2 determines whether each pixel of the continuous tone bit map image data is contained in any one of a text area (character area), a vector area (graphic area), a photograph area and the other area (unclassified area). The RIP process section 2 generates pixel identification information data having pixel identification information representing each area determined for each pixel. The RIP process section 2 supplies the generated continuous tone bit map image data and the generated pixel identification information data to the input selector 3. The other area is an area in which nothing is drawn, for example.

The RIP process section 2 may process a specific format peculiar to the apparatus, in addition to the general-purpose language, such as PDL, or process these combinations. Examples of the specific format peculiar to the apparatus include a format in which a bit map image representing a whole page or a part of a page is compressed and delivered or delivered without compression, and a format in which a bit map image representing a whole page or a part of a page is divided into two parts, that is, text information and the other information, and each of the parts is compressed and delivered or delivered without compression.

Furthermore, another format is available in which a bit map image representing a whole page is divided more finely into three parts, that is, text information, graphic information and photograph information and these are compressed and delivered or delivered without compression. Moreover, still another format is available in which a bit map image representing a part of a page is compressed and delivered or delivered without compression and supplementary information representing that each portion thereof is a text, a graphic or a photograph is also delivered at the same time, and yet still another format is available in which text information, graphic information and photograph information are not designated as bit map images but as commands. Although the above-mentioned formats are taken as examples of the specific format peculiar to the apparatus, the format is not limited to these.

Moreover, the RIP process section 2 is not limited to the generation of the continuous tone bit map image data having three color components of RGB, but may generate continuous tone bit map image data represented by the luminance tone of only one color. Still further, when PDL data or data having a specific format peculiar to the apparatus, supporting multi-color representation, for example, by CMYK (C: cyan, M: magenta, Y: yellow, K: black) of PostScript or the like, is used, the RIP process section 2 should only generate continuous tone bit map image data having four color components, such as CMYK. However, the color space representing the continuous tone bit map image data is not limited to the above-mentioned RGB or CMYK.

When pixel identification information data is generated from PDL data, the RIP process section 2 first sets values indicating an unclassified area as the initial values of the pixel identification information corresponding to all pixels before generating the continuous tone bit map image data. When drawing respective objects (drawn elements that can be interpreted from instructions supported by PDL, such as texts, graphics and images) in the continuous tone bit map image data while interpreting PDL and when the objects have been drawn as text information by using PDL instructions as information for making decisions, the RIP process section 2 changes the pixel identification information corresponding to the drawn pixels to values indicating a text area. In addition, when the objects have been drawn as graphic information, the RIP process section 2 changes the pixel identification information corresponding to the drawn pixels to values indicating a vector area.

Furthermore, when the PDL data contains an area compressed using a lossy compression method, such as JPEG or JPEG 2000, the RIP process section 2 changes the pixel identification information corresponding to the pixels drawn based on this area to values indicating a photograph area. The RIP process section 2 performs the above-mentioned process for all the pixels in the continuous tone bit map image data generated from the PDL data, thereby generating pixel identification information data having the pixel identification information corresponding to respective pixels.

In Embodiment 1, the pixel identification information data contains four kinds of pixel identification information, that is, a text area, a vector area, a photograph area and the other area (unclassified area). However, the classification method is not limited to the above-mentioned method of performing classification depending on the kind of object. For example, it may be possible to use various classification methods depending on the designation by the user or the operation mode of the image forming apparatus 100. More specifically, when large size texts have been drawn based on text information, values indicating a photograph area instead of a text area may be set in the pixel identification information corresponding to the drawn pixels or values indicating a large text area different from an ordinary text area may also be set.

In addition, also in a vector area, when a graphic having height and width values larger than constant values have been drawn based on graphic information, values indicating a photograph area instead of a vector area may be set in the pixel identification information corresponding to the drawn pixels or values indicating a large vector area different from an ordinary vector area may also be set. In this way, classification depending on the size of the object can be performed by setting pixel identification information different depending on whether the size of the same kind of object is a predetermined size or larger.

Since the pixel identification information data is used as reference information when the print image process section 8 in the subsequent stage performs color conversion and halftone generation for image data, it may be possible to use pixel identification information in which text and vector areas are divided more finely. For example, a text area may be finely divided into a black text area and a color text area to distinguish whether a text area is an achromatic text area or a chromatic text area. Furthermore, in a similar way, a vector area may be finely divided into a black vector area and a color vector area to distinguish whether a graphic area is an achromatic graphic area or a chromatic graphic area. Hence, when the print image process section 8 performs color conversion and halftone generation, monochromatization (black) process or the like can be performed easily.

In addition, the pixel identification information data should only contain pixel identification information corresponding to the respective pixels of the continuous tone bit map image data and is not necessarily required to contain the same number of the pixel identification information as the number of pixels of the continuous tone bit map image data. For example, in the continuous tone bit map image data, totally 64 pixels comprising 8 pixels in the main scanning direction and 8 pixels in the sub scanning direction are regarded as one block, and one piece of pixel identification information may be set in one block. In this case, the same pixel identification information should only be assigned to all the pixels contained in each block when the pixel identification information data is referred to. The amount of the pixel identification information data can be reduced by setting one piece of pixel identification information in one block as described above.

The input selector 3 supplies either the scanner image data from the scanner image process section 1 or the continuous tone bit map image data from the RIP process section 2 to the image compression section 4 in the subsequent stage. When the RIP process section 2 has supplied the pixel identification information data together with the continuous tone bit map image data to the input selector 3 and the input selector 3 supplies the continuous tone bit map image data to the image compression section 4, the input selector 3 also supplies the pixel identification information data to the image compression section 4. The input selector 3 has a temporary buffer memory capable of storing the scanner image data, the continuous tone bit map image data and the pixel identification information data. After receiving one page of input, the input selector 3 performs store-and-forward operation to supply the data to the image compression section 4.

Usually, the input selector 3 preferentially selects the input from the scanner image process section 1 and supplies the input to the image compression section 4. For example, when the input from the scanner image process section 1 is started while the input selector 3 receives data from the RIP process section 2, the input selector 3 stores the data being received at present from the RIP process section 2 in the temporary buffer memory and then interrupts subsequent data reception from the RIP process section 2. Then, the input selector 3 starts data reception from the scanner image process section 1 and stops data reception from the RIP process section 2 until data reception from the scanner image process section 1 is completed. While the input selector 3 stops data reception from the RIP process section 2, the RIP process section 2 temporarily stops the process of generating the continuous tone bit map image data and the pixel identification information data.

The image compression section 4 receives either the scanner image data or the continuous tone bit map image data and the pixel identification information data supplied from the input selector 3 and then performs data compression. The configuration of the image compression section 4 and the process performed by the image compression section 4 will be described later in detail.

The storage section 5 is constituted by a hard disk drive (HDD) or a nonvolatile storage unit, such as a flash memory, and receives data compressed by the image compression section 4 and stores the data. Furthermore, the compressed data stored in the storage section 5 is read by the image decompression section 6 in the subsequent stage.

The image decompression section 6 decompresses the compressed data read from the storage section 5 and supplies the decompressed scanner image data or the decompressed continuous tone bit map image data and pixel identification information data to the output selector 7. The configuration of the image decompression section 6 and the process performed by the image decompression section 6 will be described later in detail.

The output selector 7 supplies the scanner image data or the continuous tone bit map image data and the pixel identification information data, decompressed by the image decompression section 6, to the print image process section 8 or the transmission image process section 9 according to instructions from the CPU. More specifically, when the image data is to be printed out by the image output section 12, the image data is supplied to the print image process section 8. When the image data is transmitted to the external PC via the external interface section 13, the image data is supplied to the transmission image process section 9.

The print image process section 8 receives the data (the scanner image data, or the continuous tone bit map image data and the pixel identification information data) supplied from the output selector 7 and performs image process suited for the image output section 12. In addition, the print image process section 8 generates halftone image data for printing (print image data) and supplies the image data to the image output section 12. The print image process section 8 is equipped with a color conversion process section 8a and a halftone generation section 8b. The data supplied from the output selector 7 to the print image process section 8 is input to the color conversion process section 8a.

The color conversion process section 8a converts the data (the scanner image data or the continuous tone bit map image data) having three color components of RGB into continuous tone bit map image data having four colors of CMYK for printing. The halftone generation section 8b converts the continuous tone bit map image data for printing into halftone image data having four colors of CMYK for printing. On receiving the pixel identification information data from the output selector 7, the halftone generation section 8b may generate halftone bit map image data for printing using a halftone generating method different for each piece of the pixel identification information of the pixel identification information data.

For example, when a dither method is used as a halftone generating method, a threshold matrix used for the pixels of a text area and a vector area in the dither method is configured so that resolution is regarded more important than tone reproducibility, and a threshold matrix used for the pixels of a photograph area in the dither method is configured so that tone reproducibility is regarded more important than resolution. Furthermore, when an error diffusion method is used as a halftone generating method, error diffusion is performed only for neighboring pixels with respect to the text area and the vector area, and error diffusion is performed for wider neighboring pixels with respect to the photograph area.

The transmission image process section 9 receives the data (the scanner image data or the continuous tone bit map image data and the pixel identification information data) supplied from the output selector 7 and performs image process suited for a transmission image. In addition, the transmission image process section 9 generates JPEG compressed image data (transmission image data) and supplies the image data to the external interface section 13. The image process suited for the transmission image is, for example, filter process in which a filter different for each piece of pixel identification information of the pixel identification information data is used. The filter process serves as edge enhancement process (sharpening process) for the pixels of a text area.

The transmission image process section 9 is equipped with a zoom process section 9a, a JPEG compression section 9b. The data supplied from the output selector 7 to the transmission image process section 9 is input to the zoom process section 9a. The data (the scanner image data or the continuous tone bit map image data) having three color components of RGB has an image size and an output resolution suited for the image output section 12. Hence, the zoom process section 9a performs zooming so that the input data has an image size and a resolution suited for transmission to the external PC via the external interface section 13, to generate the continuous tone bit map image data. The JPEG compression section 9b compresses the zoomed continuous tone bit map image data to obtain image data of a format (JPEG format) according to JPEG File Interchange Format (JFIF) and supplies the image data to the external interface section 13.

Next, the image compression section 4 will be described below. The scanner image data output from the scanner image process section 1 or the continuous tone bit map image data and the pixel identification information data output from the RIP process section 2 are input to the image compression section 4. In order that the image data output from the scanner image process section 1 is distinguished from the image data output from the RIP process section 2, the data output from the scanner image process section 1 has been referred to as the scanner image data. However, the scanner image data is also continuous tone bit map image data, and the continuous tone bit map image data containing the scanner image data will also be referred to as continuous tone bit map image data in the following descriptions.

The image compression section 4 generates, based on the input data, one kind of lossy compression image data, two kinds of lossless compression image data (first lossless compression image data and second lossless compression image data), index color information and compressed pixel identification information data at a maximum. The image compression section 4 outputs the five kinds of the generated data at a maximum as one set and stores them in the storage section 5. When the data output from the scanner image process section 1 through the input selector 3 has been input to the image compression section 4, the pixel identification information data is not input to the image compression section 4. Furthermore, since the image compression section 4 performs only lossy compression process for the data output from the scanner image process section 1, only lossy compression image data is generated in this case.

Figure 5:
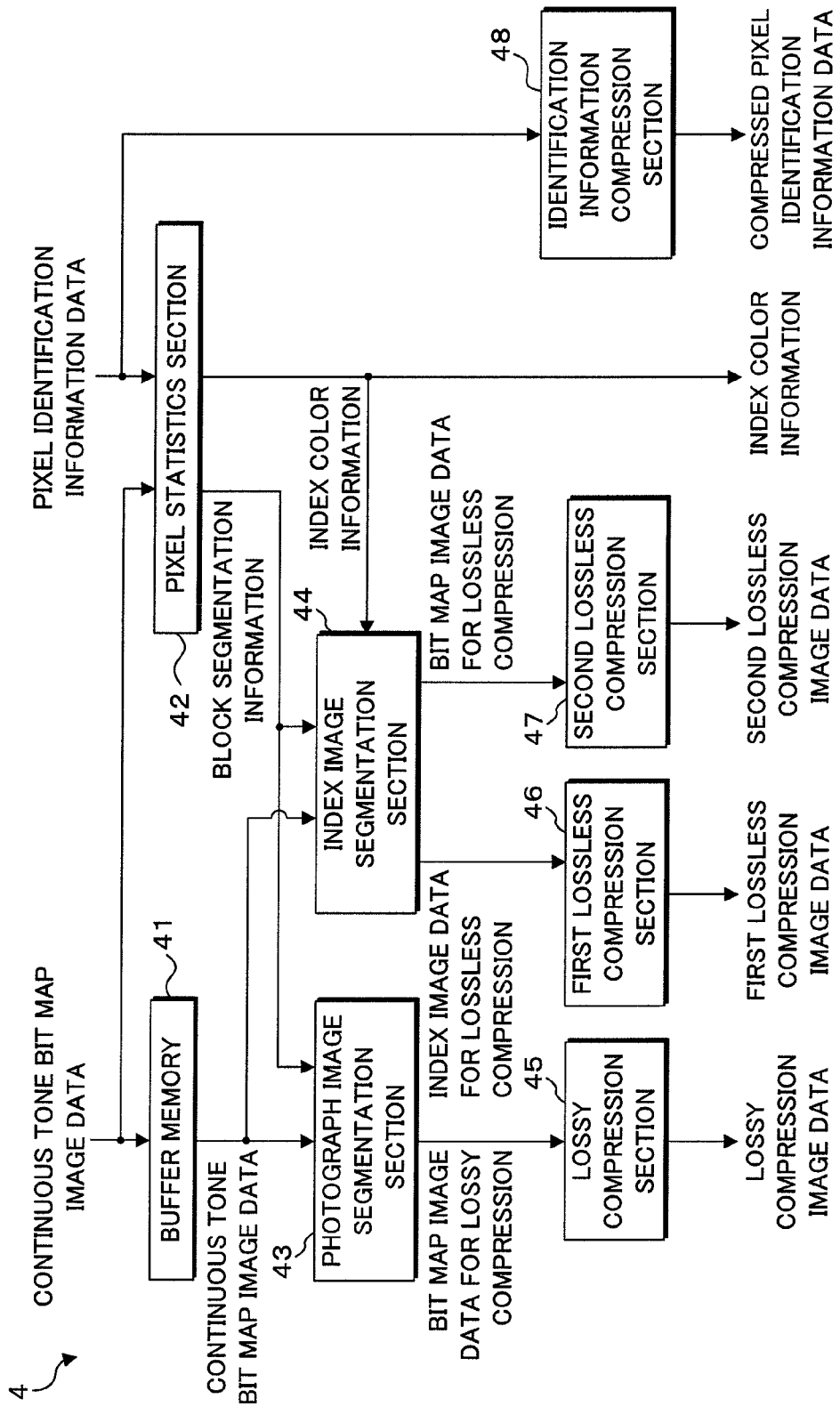
FIG. 5 is a block diagram showing the configuration of an image compression section.

FIG. 5 is a block diagram showing the configuration of the image compression section 4. The image compression section 4 is equipped with a buffer memory 41, a pixel statistics section 42 (color determination section, frequency distribution generating section), a photograph image segmentation section 43 (first image segmentation section), an index image segmentation section 44 (first image segmentation section, second image segmentation section), a lossy compression section 45 (image compression section), a first lossless compression section 46 (image compression section), a second lossless compression section 47 (image compression section), an identification information compression section 48, etc.

The image compression section 4 according to Embodiment 1 compresses continuous tone bit map image data to be input, by using the line data of 8 lines in the main scanning direction as one process unit. This is because the lossy compression section 45 according to Embodiment 1 is configured so as to perform lossy compression process according to the JPEG method. Hence, when the lossy compression section 45 is configured so as to perform compression process other than that according to the JPEG method, one process unit should only be determined in consideration of the characteristics of the compression methods used for the lossy compression section 45, the first lossless compression section 46 and the second lossless compression section 47, the parameters, the capacity of the buffer memory 41, effects on image quality due to compression process, compression efficiency, etc.

The continuous tone bit map image data and the pixel identification information data output from the input selector 3 are input to the pixel statistics section 42. When the data output from the scanner image process section 1 through the input selector 3 has been input to the image compression section 4, only the continuous tone bit map image data is input to the pixel statistics section 42. In this case, the pixel statistics section 42 performs process assuming that the pixel identification information data, in which the pixel identification information corresponding to all the pixels in the continuous tone bit map image data to be input contains values indicating an unclassified area, has been input.

The pixel statistics section 42 generates block segmentation information and index color information based on the continuous tone bit map image data and the pixel identification information data. By regarding totally 64 pixels comprising 8 pixels in the main scanning direction and 8 pixels in the sub scanning direction as one block in the continuous tone bit map image data, the block segmentation information is used as information indicating whether lossy compression or lossless compression is performed for each block. More specifically, the block segmentation information is one-bit information per block. The value 0 of the block segmentation information indicates that the corresponding block is a block in which lossy compression is performed, and the value 1 indicates that the corresponding block is a block in which lossless compression is performed. Hence, in Embodiment 1, block segmentation information for ⅛ times the number of the pixels contained in one line in the main scanning direction is generated when process (process for the line data of 8 lines) is performed once.

As described above, in Embodiment 1, the lossy compression section 45 is configured so as to perform lossy compression process according to the JPEG method, and the minimum block size during the DCT compression process according to the JPEG method is totally 64 pixels comprising 8 pixels in the main scanning direction and 8 pixels in the sub scanning direction. Hence, the pixel statistics section 42 also generates block segmentation information by using 64 pixels as one process unit similarly, but the process unit is not limited to this. For example, when JPEG 2000 is used instead of JPEG as a lossy compression method, the pixel statistics section 42 may generate block segmentation information in each tile unit or each pixel unit. Hence, as in the determination of one process unit in the image compression section 4, the generation unit of the block segmentation information should only be determined in consideration of the characteristics of the compression methods used for the lossy compression section 45, the first lossless compression section 46 and the second lossless compression section 47, the parameters, the capacity of the buffer memory 41, effects on image quality due to compression process, compression efficiency, etc.

The image compression section 4 according to Embodiment 1 performs lossless compression for text and vector areas in an image. Hence, the pixel statistics section 42 refers to the pixel identification information respectively corresponding to 64 pixels contained for each block, and when the pixel statistics section 42 judges that at least one pixel of the text and vector areas is contained in the block, the pixel statistics section 42 considers that lossless compression is performed in this block, and value 1 is set in the block segmentation information of this block. On the other hand, when no pixel of the text and vector areas is contained in the block, the pixel statistics section 42 considers that lossy compression is performed in this block, and value 0 is set in the block segmentation information of this block.

When the continuous tone bit map image data from the scanner image process section 1 has been input to the pixel statistics section 42, the pixel statistics section 42 considers that the pixel identification information data, in which the pixel identification information corresponding to all the pixels contains values indicating an unclassified area, has been input. In this case, the pixel statistics section 42 sets values 0 in the block segmentation information of all the blocks. The method for setting the block segmentation information may be changed depending on the designation by the user or the operation mode of the image forming apparatus 100. For example, when degradation of image quality due to image compression is desired to be eliminated, a function for setting values 1 in the block segmentation information of all the blocks may be provided, instead of using the pixel identification information data.

The index color information is information that is used to segment an area to be subjected to lossless compression by the first lossless compression section 46 from an area to be subjected to lossless compression in the continuous tone bit map image data, in one process unit (the line data of 8 lines). In the following descriptions, in the continuous tone bit map image data, an area to be subjected to lossy compression is referred to as bit map image data for lossy compression. In the area to be subjected to lossless compression, the area to be subjected to lossless compression by the first lossless compression section 46 is referred to as index image data for lossless compression. Furthermore, in the area to be subjected to lossless compression, an area other than the index image data for lossless compression, more specifically, the area to be subjected to lossless compression by the second lossless compression section 47, is referred to as bit map image data for lossless compression.

In Embodiment 1, when the index image data for lossless compression is segmented from an area to be subjected to lossless compression in the continuous tone bit map image data, the color information (color code) of each pixel is used. More specifically, in the color information of each pixel included in areas to be subjected to lossless compression in the continuous tone bit map image data, that is, in the text and vector areas, the pixels of color information used frequently are segmented as the index image data for lossless compression. Hence, the index color information indicates the color information of the pixels to be segmented as the index image data for lossless compression. In Embodiment 1, index color information indicating the color information of 15 colors is generated in descending order of frequency of occurrence, for one process unit (the line data of 8 lines).

The pixel statistics section 42 first creates a color histogram for an area to be subjected to lossless compression in the continuous tone bit map image data. The pixel statistics section 42 refers to the pixel identification information data, counts the number of pixels classified by each color value with respect to the pixels in the text and vector areas in one process unit (the line data of 8 lines), and creates a color histogram (frequency distribution). The pixel statistics section 42 performs descending sorting for the color histogram created in one process unit in descending order of the number of pixels. Then, the pixel statistics section 42 determines 15 colors (index colors) in descending order of the number of pixels and assigns the color codes of 15 values, 1 to 15, to the determined 15 colors, respectively. The pixel statistics section 42 correlates the color values of the 15 colors with the color codes assigned to the respective color values, thereby generating the index color information. Color code 0 is used to indicate a transparent color as described later.

Figure 6:
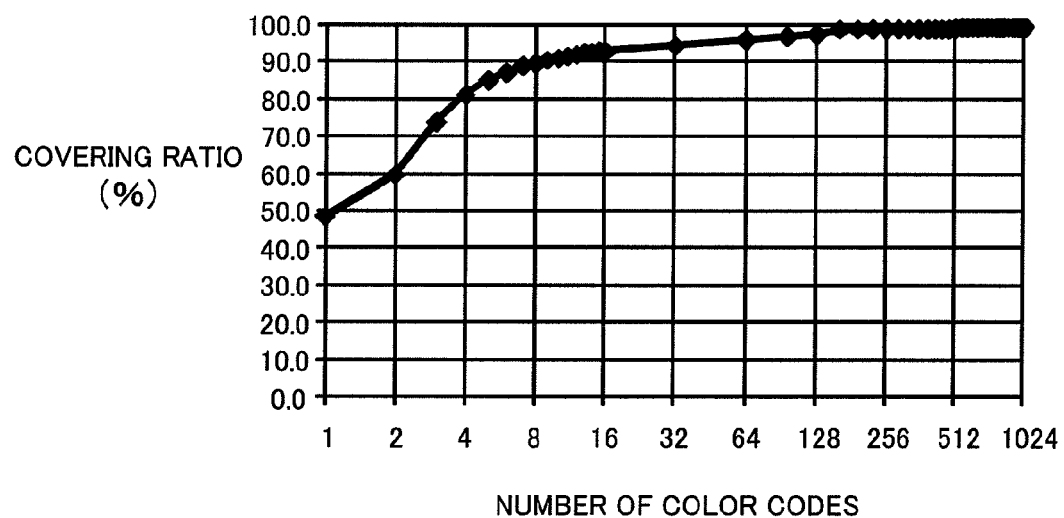
FIG. 6 is a characteristic graph showing the relationship between the number of color codes used in an image and an image covering ratio.

The continuous tone bit map image data generated from general PDL data by the image forming apparatus 100 will be described herein. FIG. 6 is a characteristic graph showing the relationship between the number of color codes used in an image and an image covering ratio. The horizontal axis in FIG. 6 represents the number of color codes used in an image, showing the range of numerals 1 to 1024. The vertical axis in FIG. 6 represents the pixel covering ratio with respect to the number of color codes for all the pixels in the text and vector areas contained in each process unit, by regarding the line data of 8 lines as one process unit in the continuous tone bit map image data. For example, when the number of color codes is 1, the covering ratio is appropriately 50%. This indicates that pixels of appropriately 50% among the pixels contained in the line data of 8 lines and corresponding to the above-mentioned condition have the same color (one color).

In other words, as shown in FIG. 6, the number of colors used in the text and vector areas in the continuous tone bit map image data generated from general PDL data is usually not large. Even when the number of color codes is 15, the covering ratio is 90% or more. Hence, in Embodiment 1, the wide range of the area to be subjected to lossless compression in the continuous tone bit map image data can be segmented as index image data for lossless compression by using the color codes of 15 colors used frequently in one process unit as index color information.

The first lossless compression section 46 is configured so as to perform compression process that is expected to obtain a compression rate higher than that obtained by the compression process of the second lossless compression section 47 as described later in detail. Hence, the compression efficiency of the entire image can be improved by segmenting the wide range of the area to be subjected to lossless compression in the continuous tone bit map image data as index image data for lossless compression.

The method for determining the index colors based on a color histogram by the pixel statistics section 42 is not limited to the method based on the number of pixels (frequency of occurrence) described above. For example, the colors used in the text area may be preferentially selected as index colors. In this case, for example, flags indicating colors to be used in the text area are prepared for respective color values in the color histogram, and the flags are set for the color values used in the text area when the pixel statistics section 42 creates a color histogram. Then, when the pixel statistics section 42 performs sorting for the created color histogram, the color values for which the flags have been set are sorted preferentially so as to be ranked high. As a result, the color values for which the flags have been set, that is, the colors used in the text area are preferentially selected as index colors.

In the text and vector areas in the continuous tone bit map image data, it is expected that the number of the pixels included in the ground color of an image is large. Furthermore, since the pixels included in the ground color of the image are not required to be compressed at a high compression rate, it may be possible that, for example, white that is used as the ground color of the image at a high possibility, is not selected as an index color. In addition, since it is also expected that black is used frequently for texts, it may be possible that black is selected preferentially as an index color.

Furthermore, although 15 colors have been determined as index colors in Embodiment 1, when the number of colors used is less than 16 in total as a result of the sorting performed for a color histogram, all the color codes ranging from 0 to 15 may be assigned to the respective colors used. In other words, in this case, the respective color codes are used, assuming that color code 0 does not indicate a transparent color. When only 16 colors are used in an area to be subjected to lossless compression in continuous tone bit map image data, the entire area to be subjected to lossless compression is compressed by the first lossless compression section 46, whereby the compression rate is further improved.

The pixel statistics section 42 outputs the generated block segmentation information to the photograph image segmentation section 43 and the index image segmentation section 44 and outputs the generated index color information to the index image segmentation section 44.

The buffer memory 41 has a memory capacity capable of storing the line data of 8 lines in continuous tone bit map image data represented by 24 bits (8 bits×3 colors) in one pixel. The buffer memory 41 sequentially stores the line data of 8 lines in the continuous tone bit map image data input from the input selector 3. The pixel statistics section 42 generates block segmentation information and index color information for the line data of 8 lines stored in the buffer memory 41. Hence, the buffer memory 41 outputs the stored line data of 8 lines to the photograph image segmentation section 43 and the index image segmentation section 44 at the timing when the pixel statistics section 42 outputs the block segmentation information and the index color information.

The continuous tone bit map image data (the line data of 8 lines) from the buffer memory 41 and the block segmentation information from the pixel statistics section 42 are input to the photograph image segmentation section 43. Based on the block segmentation information, the photograph image segmentation section 43 generates bit map image data for lossy compression in which each color of RGB is represented by 8 bits (256 gray scales) from the continuous tone bit map image data and outputs the bit map image data to the lossy compression section 45. More specifically, the photograph image segmentation section 43 specifies a block in which the value of the block segmentation information is 0 and extracts the pixel values of the pixels contained in the specified block. In addition, the photograph image segmentation section 43 masks the pixel values of the pixels contained in a block, for example, in which the block segmentation information is not 0, using a predetermined value and generates bit map image data for lossy compression.

The continuous tone bit map image data (the line data of 8 lines) from the buffer memory 41 and the block segmentation information and the index color information from the pixel statistics section 42 are input to the index image segmentation section 44. Based on the block segmentation information and the index color information, the index image segmentation section 44 generates index image data for lossless compression in which each pixel is represented by 4 bits (16 values) and bit map image data for lossless compression in which each color of RGB is represented by 8 bits (256 gray scales) from the continuous tone bit map image data.

More specifically, the index image segmentation section 44 specifies a block in which the value of the block segmentation information is 1 and extracts the pixel values of the pixels contained in the specified block. In addition, the index image segmentation section 44 judges whether the color values of respective pixels indicated by the extracted pixel values are equal to the color values contained in the index color information. When the color values of the respective pixels are equal to the color values contained in the index color information, the index image segmentation section 44 replaces the pixel values with color codes (1 to 15) correlated with the color values and uses the color codes as the pixel values of the index image data for lossless compression.

When the color values of the respective pixels indicated by the extracted pixel values are not equal to the color values contained in the index color information, the index image segmentation section 44 replaces the pixel values with color code 0 and uses color code 0 as the pixel value of the index image data for lossless compression. In the index image data for lossless compression, pixel value 0 is used to indicate a transparent color in the following process. Hence, in the areas to be subjected to lossless compression in the continuous tone bit map image data, the areas in which index colors are used are extracted, and index image data for lossless compression is generated.

Furthermore, the index image segmentation section 44 extracts the pixel values of pixels in which the color values indicated by the pixel values are not equal to the color values contained in the index color information among the pixels contained in blocks in which the value of the block segmentation information is 1 and uses the pixel values as the pixel values of the bit map image data for lossless compression. Hence, in the areas to be subjected to lossless compression in the continuous tone bit map image data, the areas other than the areas in which the index colors are used are extracted, and bit map image data for lossless compression is generated.

The index image segmentation section 44 outputs the generated index image data for lossless compression to the first lossless compression section 46 and outputs the generated bit map image data for lossless compression to the second lossless compression section 47.

FIGS. 7A, 7B, 8A, 8B and 8C are schematic views for explaining process of segmenting continuous tone bit map image data. FIG. 7A shows an example of continuous tone bit map image data, showing a part of the line data of 8 lines. The vertical lines in FIG. 7A indicate the boundaries of blocks in the line data of 8 lines, wherein one block is regarded as totally 64 pixels comprising 8 pixels in the main scanning direction and 8 pixels in the sub scanning direction. Furthermore, the respective hatched areas in FIG. 7A represent colors different from one another.

FIG. 7B shows an example of pixel identification information data corresponding to the continuous tone bit map image data shown in FIG. 7A. FIG. 7B also shows an example in which each pixel is contained in any one of a text area, a vector area, a photograph area and an unclassified area. FIG. 8A shows an example of bit map image data for lossy compression generated from the continuous tone bit map image data shown in FIG. 7A based on the pixel identification information data shown in FIG. 7B. Furthermore, FIGS. 8B and 8C respectively shows examples of index image data for lossless compression and bit map image data for lossless compression generated from the continuous tone bit map image data shown in FIG. 7A based on the pixel identification information data shown in FIG. 7B.

As shown in FIG. 8A, only one block in which all the pixels are contained in the photograph area is contained in the bit map image data for lossy compression. In FIG. 8A, only the rightmost block is extracted from the continuous tone bit map image data, and the pixel values of the pixels of the other blocks are masked with a predetermined value, for example. As shown in FIG. 8B, among the pixels in blocks containing at least one pixel contained in the text area or the vector area, the pixels having color values corresponding to the index colors are contained in the index image data for lossless compression.

As shown in FIG. 8C, image data obtained by eliminating the bit map image data for lossy compression shown in FIG. 8A and the index image data for lossless compression shown in FIG. 8B from the continuous tone bit map image data shown in FIG. 7A is contained in the bit map image data for lossless compression. In other words, among the pixels in blocks containing at least one pixel contained in the text area or the vector area, the pixels having color values not corresponding to the index colors and the pixels contained in the photograph area are contained in the bit map image data for lossless compression.

Since the pixels contained in the index image data for lossless compression have been extracted from the bit map image data for lossless compression, when it is assumed that the pixel values of the extracted pixels are 255 (white) for RGB, edge components are generated at portions from which the pixels are extracted. Such a bit map image data for lossless compression may lead to reduction in compression efficiency, thereby being undesirable in some cases. To prevent this, pixel values estimated by pixel value estimation in the lossless compression method (the JPEG-LS method in Embodiment 1) used in the second lossless compression section 47 may be assigned to the pixels (the pixels contained in the index image data for lossless compression) extracted from the bit map image data for lossless compression.

The lossy compression section 45 performs the lossy compression process according to the JPEG method for the bit map image data for lossy compression obtained from the photograph image segmentation section 43, and generates lossy compression image data. The lossy compression section 45 may perform the lossy compression process according to the JPEG 2000 method other than the JPEG method, for example. However, the method is not limited to these methods.

The first lossless compression section 46 regards the index image data for lossless compression obtained from the index image segmentation section 44 as a binary image of four bit planes, and performs the binary image lossless compression process according to the JPEG method for each bit plane. First, the first lossless compression section 46 segments the index image data for lossless compression, for each bit plane. Since the index image data for lossless compression has 4 bits per pixel, the first lossless compression section 46 segments the index image data for lossless compression into four planes of 1-bit image data having the respective bits (bit 0, bit 1, bit 2 and bit 3) of each pixel value.

The first lossless compression section 46 performs the lossless compression process according to the JBIG method for the segmented four bit planes sequentially, and generates first lossless compression image data. The first lossless compression section 46 may perform the compression process according to the binary image lossless compression methods, such as the MH method, the MR method (ITU-T recommendation T.4), the MMR method (ITU-T recommendation T.6) and the JBIG2 method recommended by ITU-T, in addition to the JPEG method. However, the method is not limited to these methods.

The second lossless compression section 47 performs the lossless compression process according to the JPEG-LS method for the bit map image data for lossless compression obtained from the index image segmentation section 44, and generates second lossless compression image data. The second lossless compression section 47 may perform the compression process according to the multilevel image lossless compression methods, such as the Lossless JPEG method and JPEG 2000 method, in addition to the JPEG-LS method. However, the method is not limited to these methods.

When the data output from the RIP process section 2 has been input to the image compression section 4 through the input selector 3, the identification information compression section 48 obtains the pixel identification information data input from the input selector 3. Since the pixel identification information data is information indicating that each pixel belongs to which one of four kinds of areas (a text area, a vector area, a photograph area and an unclassified area), the pixel identification information data has the same size as that of the continuous tone bit map image data, and has 2 bits (4 values) per pixel.

The identification information compression section 48 regards the pixel identification information data as a binary image of two bit planes, and performs the binary image lossless compression process according to the MRR method for each bit plane. First, the identification information compression section 48 segments the pixel identification information data for each bit plane. Since the pixel identification information data has 2 bits per pixel, the identification information compression section 48 segments the pixel identification information data into two planes of 1-bit image data, that is, a bit plane having the MSB (most significant bit) of each pixel and a bit plane having the LSB (least significant bit) of each pixel.

The identification information compression section 48 performs the lossless compression process according to the MMR method for the segmented two bit planes sequentially, and generates pixel identification information compression data. The identification information compression section 48 may perform the compression process according to the binary image lossless compression methods, such as the MH method, the MR method, the JBIG method and the JBIG2 method, in addition to the MRR method. However, the method is not limited to these methods.

Figure 9:
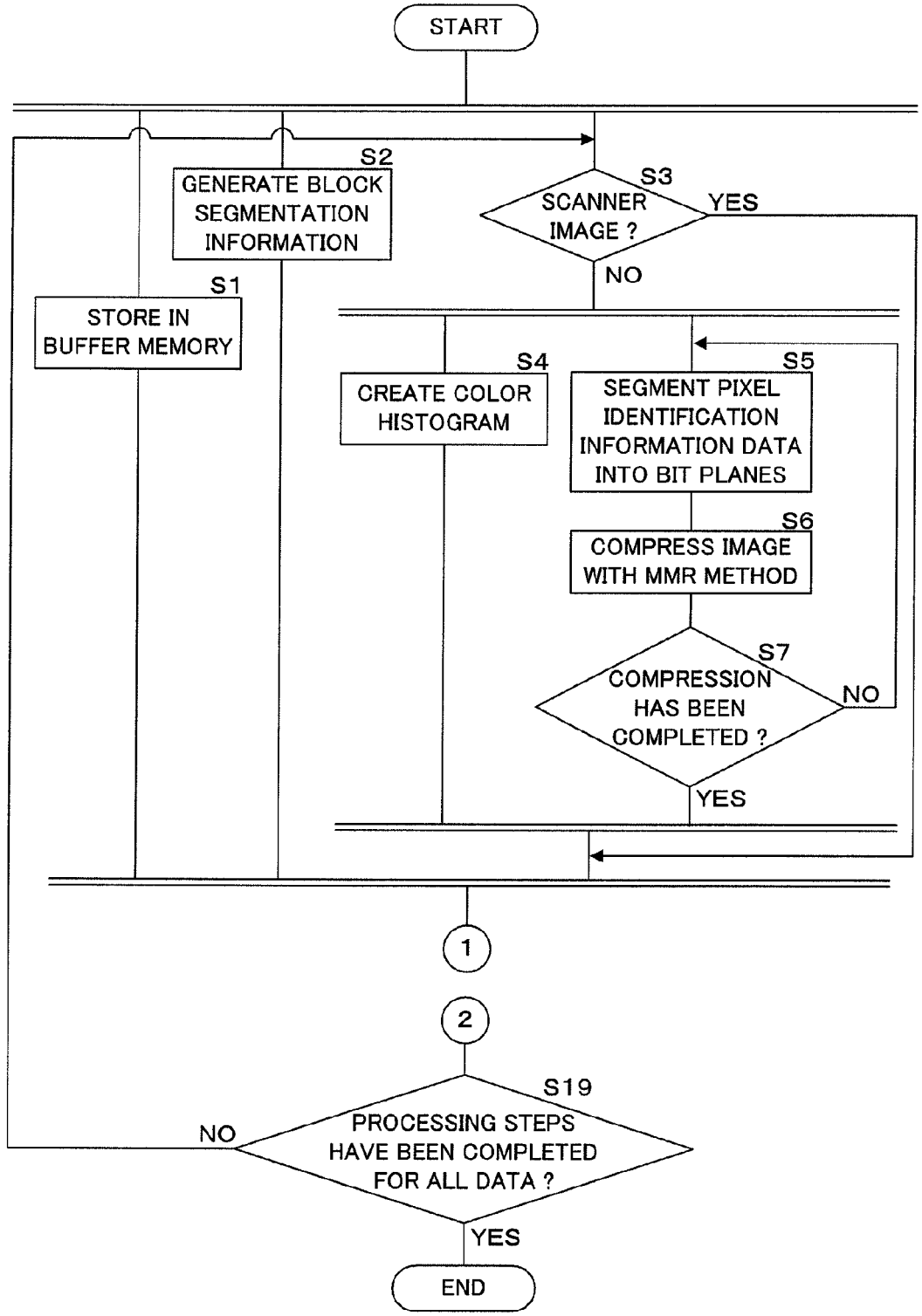
FIG. 9 is a flowchart showing the procedure of the image compression process performed by the image compression section.
Figure 10:
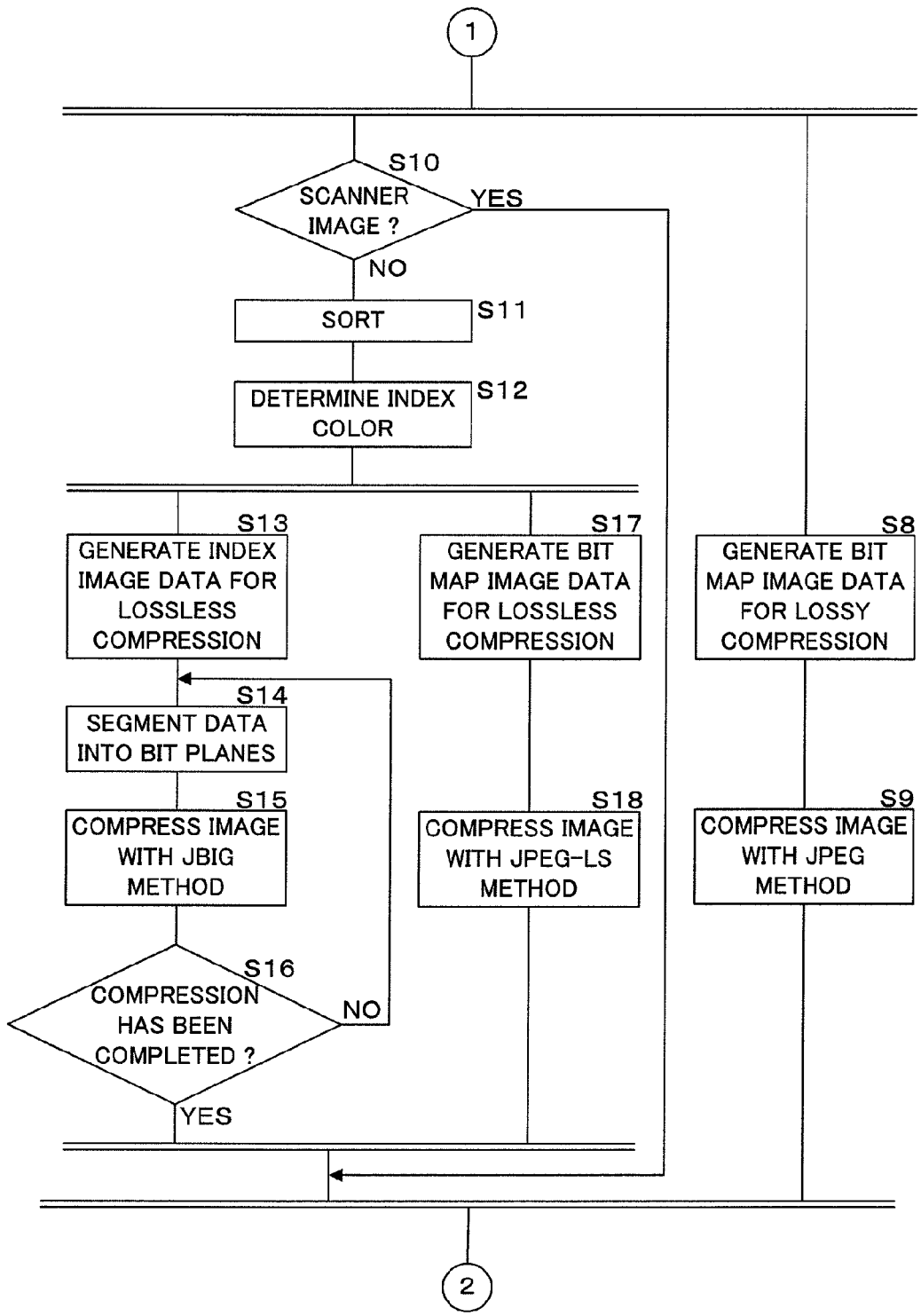
FIG. 10 is another flowchart showing the procedure of the image compression process performed by the image compression section.

The process performed by the image compression section 4 of the image forming apparatus 100 according to Embodiment 1 will be described below based on flowcharts. FIGS. 9 and 10 are flowcharts showing the procedure of the image compression process performed by the image compression section 4.

When the input of the continuous tone bit map image data from the input selector 3 is started, the image compression section 4 performs step S1, step S2 and steps S3 to S7 in parallel with one another. The image compression section 4 first stores the continuous tone bit map image data input sequentially from the input selector 3 in the buffer memory 41 (at step S1).

In addition, the image compression section 4 refers to the pixel identification information data input sequentially from the input selector 3, and generates block segmentation information corresponding to each block in the continuous tone bit map image data (at step S2). The block is a block having totally 64 pixels comprising 8 pixels in the main scanning direction and 8 pixels in the sub scanning direction, and the block segmentation information is information indicating whether lossless compression or lossy compression is performed for each block. When the pixel identification information data has not been input from the input selector 3, the image compression section 4 generates information indicating that lossy compression is performed, as the block segmentation information corresponding to all the blocks.

The image compression section 4 judges whether the continuous tone bit map image data input from the input selector 3 is scanner image data read from a document by the image input section 11 (at step S3). When the pixel identification information data is not input from the input selector 3, the image compression section 4 can judge that the input continuous tone bit map image data is scanner image data. When the image compression section 4 judges that the continuous tone bit map image data is scanner image data (YES at step S3), the image compression section 4 skips steps S4 to S7. When the image compression section 4 judges that the continuous tone bit map image data is not scanner image data (NO at step S3), the image compression section 4 performs step S4 and steps S5 to S7 in parallel with one another.

The image compression section 4 refers to the pixel identification information data, counts the number of pixels classified by each color value for the pixels in the text and vector areas in the line data of 8 lines to be stored in the buffer memory 41, and creates a color histogram (at step S4). On the other hand, the image compression section 4 segments the pixel identification information data into two bit planes (at step S5). Then, the image compression section 4 performs the lossless compression process according to the MMR method for each block plane (at step S6), and generates compressed pixel identification information data. The image compression section 4 judges whether the compression process for the pixel identification information corresponding to the line data of 8 lines has been completed (at step S7). When the image compression section 4 judges that the compression process has not been completed (NO at step S7), the procedure returns to step S5, and steps S5 to S7 are repeated. When the image compression section 4 judges that the compression process has been completed (YES at step S7), the procedure advances to the subsequent step.

After steps S1 to S7 have been completed, block segmentation information, a color histogram and compressed pixel identification information data corresponding to the line data of 8 lines stored in the buffer memory 41 are generated, and the procedure to be performed by the image compression section 4 advances to the subsequent step. Note that if the image compression section 4 has generated the block segmentation information and the color histogram, the procedure may advance to the subsequent step even when the compressed pixel identification information data is being generated.

Next, the image compression section 4 performs steps S8 and S9 and steps S10 to S18 in parallel with one another. The image compression section 4 generates bit map image data for lossy compression from the line data of 8 lines stored in the buffer memory 41 based on the block segmentation information generated at step S2 (at step S8). The image compression section 4 performs the lossy compression process according to the JPEG method for the generated bit map image data for lossy compression (at step S9), thereby generating lossy compression image data.

The image compression section 4 judges whether the continuous tone bit map image data input from the input selector 3 is the scanner image data read from the document by the image input section 11 (at step S10). When the image compression section 4 judges that the continuous tone bit map image data is the scanner image data (YES at step S10), the image compression section 4 skips steps S11 to S18. When the image compression section 4 judges that the continuous tone bit map image data is not the scanner image data (NO at step S10), the image compression section 4 performs descending sorting for the color histogram created at step S4 based on the number of pixels (at step S11).

The image compression section 4 determines 15 colors as index colors based on the color histogram having been subjected to the sorting (at step S12). For example, the image compression section 4 determines 15 colors as index colors in descending order of the number of pixels, and assigns color codes 1 to 15 to the color values of the determined 15 colors serving as index colors sequentially. Next, the image compression section 4 performs steps S13 to S16 and steps S17 and S18 in parallel with one another.

The image compression section 4 generates index image data for lossless compression and bit map image data for lossless compression from the line data of 8 lines stored in the buffer memory 41, based on the block segmentation information generated at step S2 and the index colors determined at step S12 (at steps S13 and S17). The image compression section 4 segments the generated index image data for lossless compression into four bit planes (at step S14). Then, the image compression section 4 performs the lossless compression process according to the JBIG method for each bit plane (at step S15), thereby generating first lossless compression image data.

The image compression section 4 judges whether the compression process for the index image data for lossless compression generated at step S13 has been completed (at step S16). When the image compression section 4 judges that the compression process has not been completed (NO at step S16), the procedure returns to step S14, and steps S14 to S16 are repeated, and when the image compression section 4 judges that the compression process has been completed (YES at step S16), the procedure advances to the subsequent step.

Furthermore, the image compression section 4 performs the lossless compression process according to the JPEG-LS method for the bit map image data for lossless compression generated at step S17 (at step S18), and generates second lossless compression image data. After steps S8 to S18 have been completed, based on the line data of 8 lines stored in the buffer memory 41 at step S1, lossy compression image data, first lossless compression image data, second lossless compression image data, index color information and compressed pixel identification information data are generated.

The image compression section 4 judges whether the above-mentioned process steps have been completed for all of the continuous tone bit map image data input from the input selector 3 (at step S19). When the image compression section 4 judges that the process steps for all of the continuous tone bit map image data have not been completed (NO at step S19), the procedure to be performed by the image compression section 4 returns to step S1, and the above-mentioned process steps are repeated until the process steps for all of the continuous tone bit map image data are completed. When the image compression section 4 judges that the process steps for all of the continuous tone bit map image data have been completed (YES at step S19), the image compression section 4 completes the above-mentioned process steps.

As described above, based on the pixel identification information data shown in FIG. 7B, the image compression section 4 generates the bit map image data for lossy compression shown in FIG. 8A, the index image data for lossless compression shown in FIG. 8B and the bit map image data for lossless compression shown in FIG. 8C from the continuous tone bit map image data shown in FIG. 7A. Then, the image compression section 4 performs compression process that differs according to the bit map image data for lossy compression, the index image data for lossless compression and the bit map image data, for lossless compression, for the bit map image data for lossy compression, the index image data for lossless compression and the bit map image data for lossless compression. Since compression process suited for each kind of data is performed, efficient compression process can be attained for the entire image in consideration of the compression rate in each type of compression process and the throughput and resources required for the process.

Next, the image decompression section 6 will be described below. The lossy compression image data, the first lossless compression image data, the second lossless compression image data, the index color information and the compressed pixel identification information data generated by the image compression section 4 are input from the storage section 5 to the image decompression section 6. When the image compression section 4 has compressed the scanner image data read from the document by the image input section 11, only the lossy compression image data is obtained as compressed data. In this case, the image decompression section 6 obtains only the lossy compression image data from the storage section 5.

Based on the input lossy compression image data, first lossless compression image data, second lossless compression image data, index color information and compressed pixel identification information data, the image decompression section 6 generates decompressed continuous tone bit map image data and pixel identification information data. The image decompression section 6 outputs the decompressed continuous tone bit map image data and the pixel identification information data that have been generated, to the output selector 7 in the subsequent stage. The image decompression section 6 according to Embodiment 1 performs decompression process by using the line data of 8 lines in the main scanning direction as one process unit, as in the case of the image compression section 4. Furthermore, when the image decompression section 6 has obtained only lossy compression image data, the image decompression section 6 performs decompression process for the lossy compression image data, and outputs the decompressed data to the output selector 7 in the subsequent stage.

Figure 11:
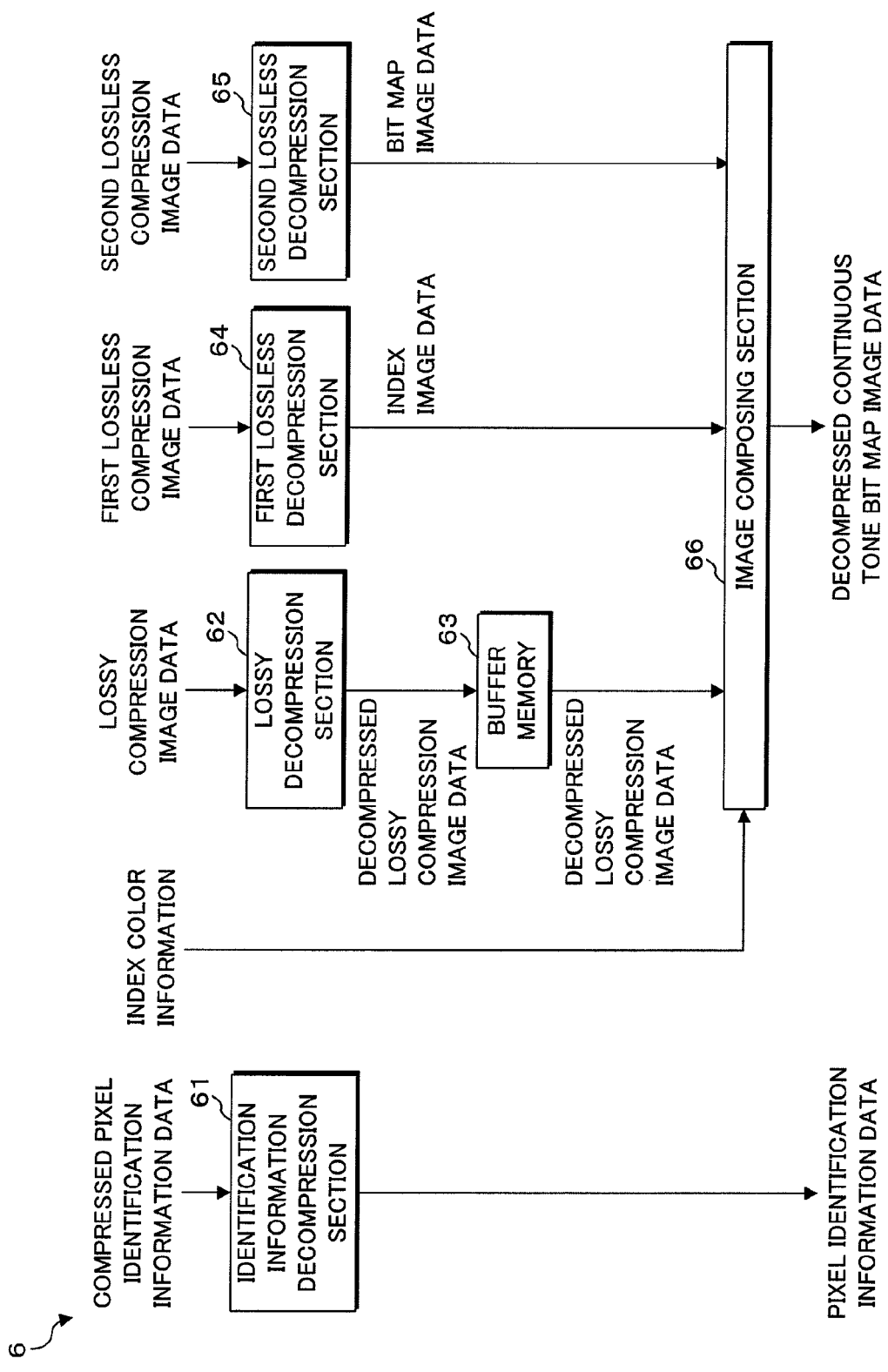
FIG. 11 is a block diagram showing the configuration of an image decompression section.

FIG. 11 is a block diagram showing the configuration of the image decompression section 6. The image decompression section 6 is equipped with an identification information decompression section 61, a lossy decompression section 62 (image decompression section), a buffer memory 63, a first lossless decompression section 64 (image decompression section), a second lossless decompression section 65 (image decompression section), an image composing section 66, etc.

The identification information decompression section 61 obtains the compressed pixel identification information data from the storage section 5. The identification information decompression section 61 performs, for the compressed pixel identification information data, decompression process according to the same method as the method according to the compression process performed by the identification information compression section 48 of the image compression section 4. More specifically, the identification information decompression section 61 performs the decompression process according to the MMR method for the respective compressed binary image data corresponding to two bit planes constituting the compressed pixel identification information data. Furthermore, the identification information decompression section 61 combines the decompressed two bit planes, thereby sequentially restoring the pixel identification information having 2 bits (4 values) per pixel and generating pixel identification information data.

The lossy decompression section 62 performs lossy decompression process according to the JPEG method for the lossy compression image data obtained from the storage section 5 and generates lossy decompression image data. Each piece of pixel data of the lossy decompression image data is represented using three color components of RGB, and each color component is represented by 256 gray scales that can be represented by 8 bits. Although the lossy decompression image data is approximate to the bit map image data for lossy compression before compression, since the compression method is a lossy compression method, the lossy decompression image data is not completely equal to the bit map image data for lossy compression before compression. The lossy decompression section 62 stores the generated lossy decompression image data in the buffer memory 63 sequentially.

The buffer memory 63 temporarily stores the lossy decompression image data having been decompressed by the lossy decompression section 62. The buffer memory 63 outputs the lossy decompression image data to the image composing section 66 together with the index image data decompressed by the first lossless decompression section 64, the bit map image data decompressed by the second lossless decompression section 65 and the input index color information. Although the lossy decompression section 62 performs decompression process according to the JPEG method in block units, the first lossless decompression section 64 and the second lossless decompression section 65 perform decompression process in pixel units by scanning pixels in the main scanning direction from the upper left of an image and by scanning the adjacent line in the sub scanning direction after the scanning of one line. Hence, the buffer memory 63 is used to output the lossy decompression image data to the image composing section 66 in synchronization with the output of the other decompressed data.

The first lossless decompression section 64 obtains the first lossless compression image data from the storage section 5. The first lossless decompression section 64 performs the decompression process according to the JBIG method for the compressed binary image data corresponding to four bit planes constituting the first lossless compression image data. Furthermore, the first lossless decompression section 64 combines the decompressed four bit planes, thereby restoring the index image data represented by the color codes having 4 bits (16 values) per pixel.

The second lossless decompression section 65 performs the lossy decompression process according to the JPEG-LS method for the second lossless compression image data obtained from the storage section 5, and generates bit map image data. Each piece of pixel data of the decompressed bit map image data is represented using three color components of RGB, and each color component is represented by 256 gray scales that can be represented by 8 bits.

The index color information, the lossy decompression image data, the index image data and the bit map image data are input to the image composing section 66 in synchronization. The image composing section 66 generates decompressed continuous tone bit map image data based on the respective input data. The image composing section 66 superimposes the lossy decompression image data, the bit map image data and the index image data in this order, thereby composing the respective data and generating the decompressed continuous tone bit map image data.

More specifically, the image composing section 66 first judges whether the pixel value (color code) of each pixel in the index image data is value 0 indicating a transparent color. When the pixel value is not the value indicating a transparent color, that is, when the color of a pixel in the index image data is not a transparent color, the image composing section 66 sets the color value corresponding to the color code of each pixel and contained in the index color information to the pixel value after the composition. When the color is a transparent color, that is, when the color of a pixel in the index image data is a transparent color, the image composing section 66 judges whether the pixel value of each pixel in the bit map image data corresponding to the position of each pixel is value 255 (white) for RGB.

When the color is not white, that is, when the color of the pixel in the bit map image data is not white, the image composing section 66 sets the pixel value of each pixel in the bit map image data to the pixel value obtained after the composition. When the color is white, that is, when the color of the pixel in the bit map image data is white, the image composing section 66 assumes that the pixel is a transparent pixel, and sets the pixel value of each pixel in the lossy decompression image data corresponding to the position of each pixel to the pixel value after the composition. As described above, in Embodiment 1, the highest priority is given to the index image data and the next priority is given to the bit map image data, and the image composing section 66 superimposes the respective kinds of image data, thereby generating the decompressed continuous tone bit map image data.

As described above, the index image data is superimposed on the bit map image data for composition. Hence, among the pixels of the bit map image data, pixels not coming out to the surface when overwritten by the pixels of the index image data can be set to appropriate pixel values to improve the compression ratio for the bit map image data.

Although the decompressed continuous tone bit map image data is approximate to the continuous tone bit map image data before compression by the image compression section 4, when the decompressed continuous tone bit map image data contains pixels compressed by the lossy compression method and then decompressed later, the decompressed continuous tone bit map image data is not completely equal to the continuous tone bit map image data before compression. When the decompressed continuous tone bit map image data does not contain pixels compressed by the lossy compression method and then decompressed later, the continuous tone bit map image data before compression is equal to the decompressed continuous tone bit map image data.

Figure 12:
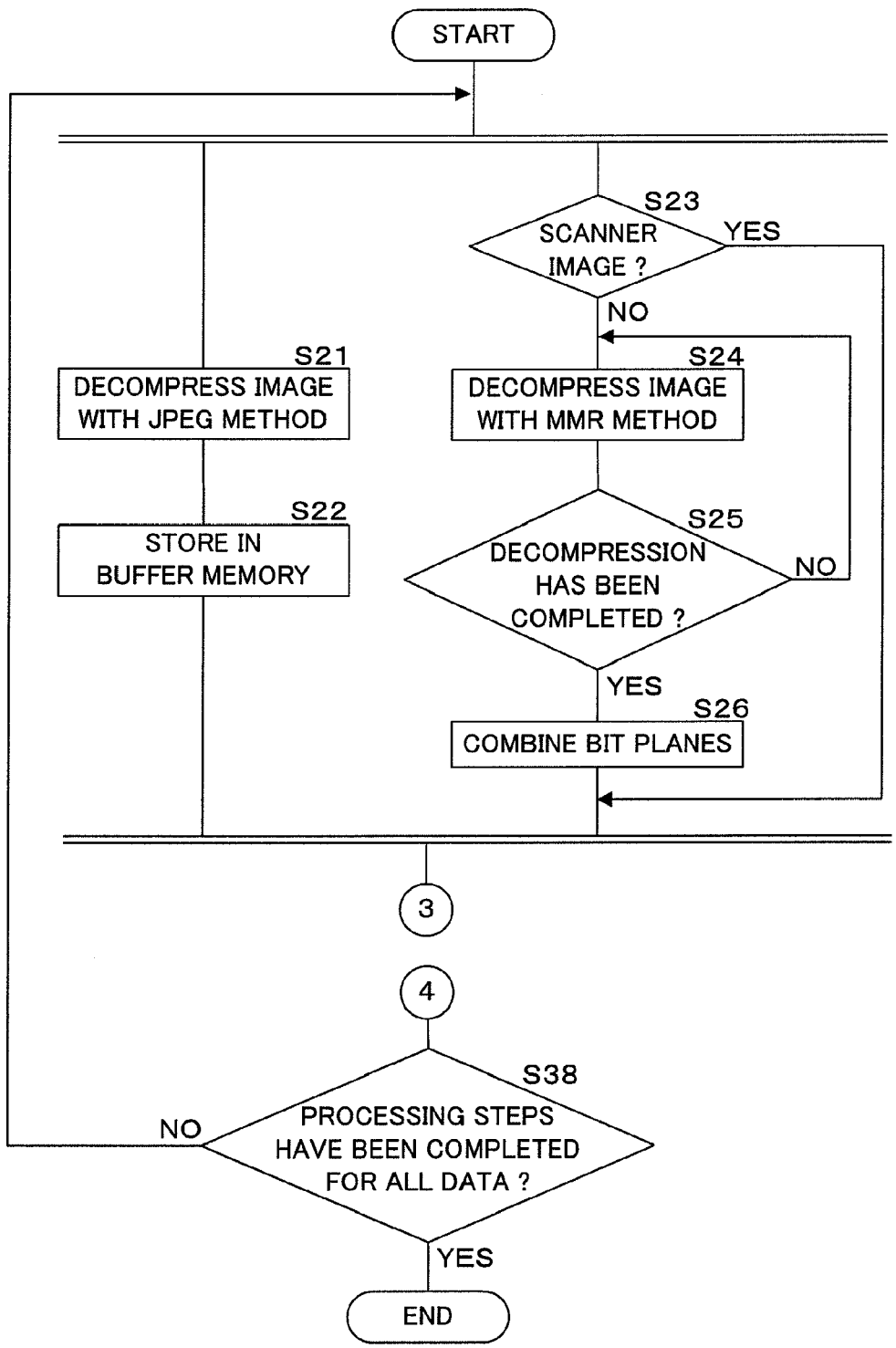
FIG. 12 is a flowchart showing the procedure of the image decompression process performed by the image decompression section.
Figure 13:
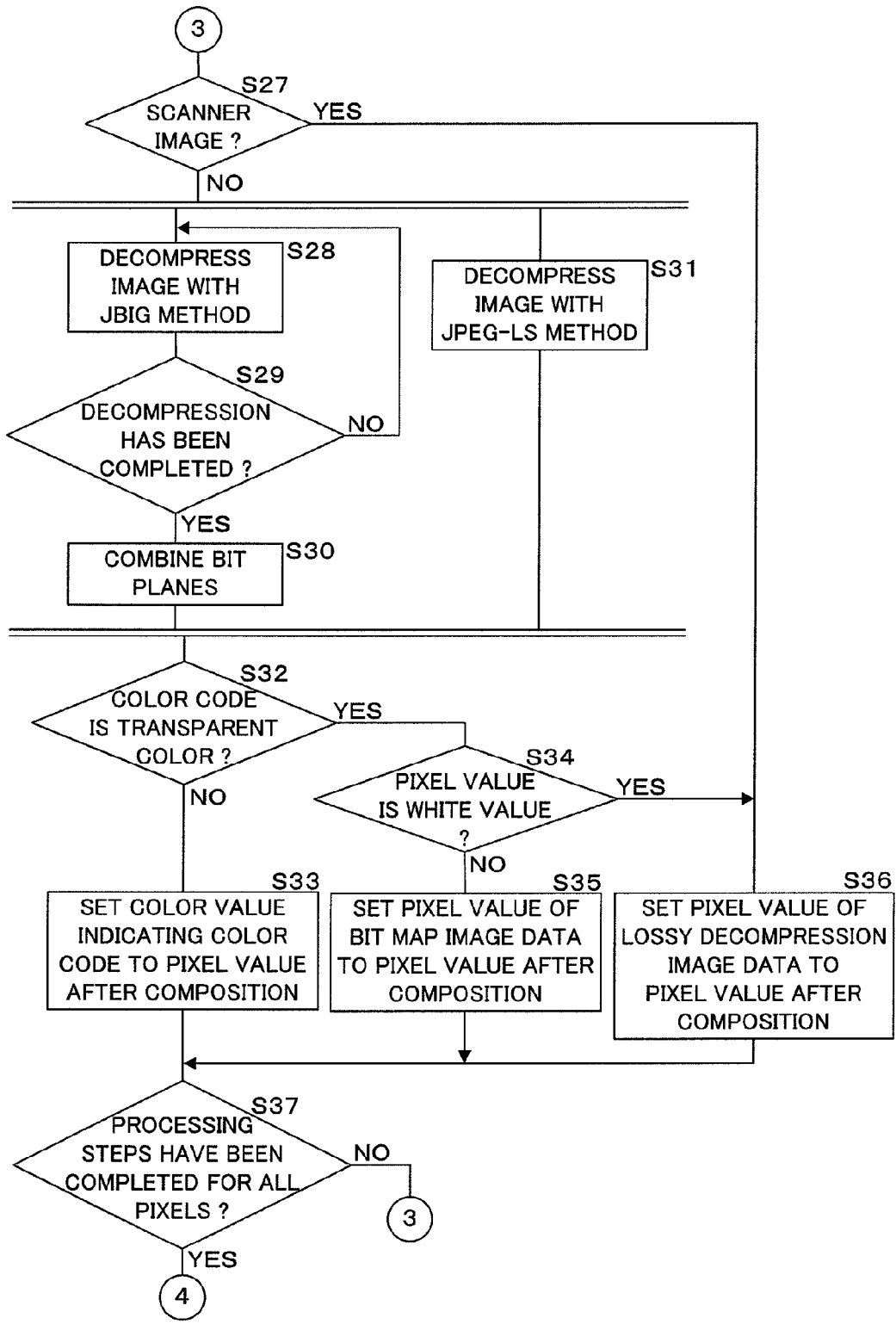
FIG. 13 is another flowchart showing the procedure of the image decompression process performed by the image decompression section.

The process to be performed by the image decompression section 6 of the image forming apparatus 100 according to Embodiment 1 will be described below based on flowcharts. FIGS. 12 and 13 are flowcharts showing the procedure of the image decompression process by the image decompression section 6.

On starting the reading of the data stored in the storage section 5, the image decompression section 6 performs steps S21 and S22 and steps S23 to S26 in parallel with one another. The image decompression section 6 first performs the lossy decompression process according to the JPEG method for the lossy compression image data read from the storage section 5 (at step S21), thereby generating lossy decompression image data. The image decompression section 6 stores the generated lossy decompression image data into the buffer memory 63 sequentially (at step S22).

On the other hand, the image decompression section 6 judges whether the compressed data to be processed is data obtained by compressing the scanner image data read from the document by the image input section 11 (at step S23). When the compressed data to be processed is the scanner image data, the image decompression section 6 obtains only the lossy compression image data from the storage section 5. Hence, when the image decompression section 6 has obtained only the lossy compression image data from the storage section 5, the image decompression section 6 judges that the compressed data to be processed is the scanner image data.

When the image decompression section 6 judges that the compressed data to be processed is the scanner image data (YES at step S23), the image decompression section 6 skips steps S24 to S26. When the image decompression section 6 judges that the compressed data to be processed is not the scanner image data (NO at step S23), the image decompression section 6 performs the lossless decompression process according to the MMR method for the respective two bit planes constituting the pixel identification information data (at step S24). The image decompression section 6 judges whether the decompression process for the two bit planes has been completed (at step S25). When the image decompression section 6 judges that the decompression process has not been completed (NO at step S25), the procedure returns to step S24, and the decompression process continues.

When the image decompression section 6 judges that the decompression process has been completed (YES at step S25), the image decompression section 6 combines the decompressed two bit planes (at step S26) to restore the pixel identification information data. After steps S21 to S26 have been completed, the decompression process for the pixel identification information data is completed, and lossy decompression image data for the line data of 8 lines is stored in the buffer memory 63.

Next, the image decompression section 6 judges whether the compressed data to be processed is the scanner image data (at step S27). When the image decompression section 6 judges that the compressed data is the scanner image data (YES at step S27), the procedure advances to step S36. When the image decompression section 6 judges that the compressed data to be processed is not the scanner image data (NO at step S27), the image decompression section 6 performs steps S28 to S30 and step S31 in parallel with one another.

The image decompression section 6 performs the lossless decompression process according to the JBIG method for the respective four bit planes constituting the first lossless compression image data (at step S28). The image decompression section 6 judges whether the decompression process for the four bit planes has been completed (at step S29). When the image decompression section 6 judges that the decompression process has not been completed (NO at step S29), the procedure returns to step S28, the decompression process continues. When the image decompression section 6 judges that the decompression process has been completed (YES at step S29), the image decompression section 6 combines the decompressed four bit planes (at step S30), thereby generating index image data.

The image decompression section 6 performs the lossless decompression process according to the JPEG-LS method for the second lossless compression image data (at step S31), thereby generating bit map image data. After steps S28 to S31 have been completed, the image decompression section 6 completes the decompression process for all the compressed data based on the line data of 8 lines.

The image decompression section 6 judges whether the color code (pixel value) of each pixel is value 0 indicating a transparent color in the index image data generated by combining the bit planes at step S30 (at step S32). When the image decompression section 6 judges that the color code does not indicate a transparent color (NO at step S32), the image decompression section 6 sets the color value indicating the color code of each pixel, not indicating a transparent color, to a pixel value after the composition (at step S33). When the image decompression section 6 judges that the color code indicates a transparent color (YES at step S32), the image decompression section 6 judges whether the pixel value of each pixel in the bit map image data corresponding to the position of each pixel contained in the index image data and having a color code indicating a transparent color has a white value (value 255 for RGB) (at step S34).

When the image decompressing section 6 judges that the pixel value is not the white value (NO at step S34), the image decompression section 6 sets the pixel value of each pixel of the bit map image data to a pixel value after the composition (at step S35). When the image decompressing section 6 judges that the pixel value is the white value (YES at step S34), the image decompression section 6 sets the pixel value of each pixel in the lossy decompression image data corresponding to the position of each pixel contained in the bit map image data and having a color code indicating white, to a pixel value after the composition (at step S36). On the other hand, when the image decompression section 6 judges that the compressed data to be processed is the scanner image data (YES at step S27), the image decompression section 6 sets the pixel value of each pixel in the lossy decompression image data to a pixel value after the composition (at step S36).

The image decompression section 6 judges whether the above-mentioned steps S27 to S36 have been completed for all the pixels in the line data of 8 lines (at step S37). When the image decompression section 6 judges that the steps for all the pixels have not been completed (NO at step S37), the image decompression section 6 returns the procedure to step S27, and the above-mentioned steps are repeated. As a result, decompressed continuous tone bit map image data of the line data of 8 lines is generated.

When the image decompression section 6 judges that the steps for all the pixels have been completed (YES at step S37), the image decompression section 6 judges whether the above-mentioned steps have been completed for all the compressed data read from the storage section 5 (at step S38). When the image decompression section 6 judges that the steps for all the compressed data have not been completed (NO at step S38), the image decompression section 6 returns the procedure to step S21, and the above-mentioned steps are repeated until the steps for all the compressed data are completed. As a result, decompressed continuous tone bit map image data for one plate is generated. When the image decompression section 6 judges that the steps for all the compressed data have been completed (YES at step S 38), the image decompression section 6 completes the above-mentioned steps.

At step S32 for the above-mentioned decompression process, the image decompression section 6 judges whether the color code of each pixel is value 0 indicating a transparent color in the index image data. However, when the index color information has color codes of less than 16 colors, the image decompression section 6 may judge that only less than 16 colors are present in the lossless compression area in the continuous tone bit map image data including the bit map image data, and steps S34 and S35 may be skipped.

FIG. 14 is a table showing the effects obtained when the present invention is applied. FIG. 14 shows the results obtained by evaluating the effects of improvement in compression rate in comparison with the related art in the case that the art described in Embodiment 1 is applied to general print output image information at which the art of the present invention is aimed. In addition, FIG. 14 shows examples of the effects obtained by applying the present invention to three test sets 1, 2 and 3 used as sample sets. Image samples contained in the respective test sets 1, 2 and 3 are different from one another. The test set 1 contains 12 image samples, the test set 2 contains 20 image samples, and the test set 3 contains 12 image samples.

As the evaluation results, FIG. 14 shows the total number of pixels A constituting all the image samples contained in each of the test sets 1, 2 and 3, and also shows lossless compression target ratio B (%) indicating the ratio of the number of pixels targeted for lossless compression with respect to the total number of pixels A. Furthermore, FIG. 14 shows index image covering ratio C (%) indicating the ratio of the number of pixels capable of being contained actually in index image data represented by 4 bits per pixel with respect to the total number of pixels A. Moreover, for all the image samples contained in the test sets 1, 2 and 3 in the case that the art according to Embodiment 1 is applied, FIG. 14 shows the total number of bytes of lossless compression data D obtained by adding the number of bytes of the first lossless compression image data compressed by the first lossless compression section 46, the number of bytes of the second lossless compression image data compressed by the second lossless compression section 47 and the number of the bytes of the index color information.

Furthermore, in comparison with the related art, FIG. 14 shows the results obtained when all the areas to be subjected to lossless compression in the continuous tone bit map image data are contained in the bit map image data for lossless compression without generating index image data for lossless compression at the index image segmentation section 44. More specifically, when all the areas to be subjected to lossless compression in the continuous tone bit map image data are subjected to lossless compression by the second lossless compression section 47, for all the image samples respectively contained in the test sets 1, 2 and 3, FIG. 14 shows the total number E of bytes of JPEG-LS compressed data obtained by adding the numbers of bytes of the second lossless compression image data compressed by the second lossless compression section 47. Still further, FIG. 14 shows lossy compression progress rate F that is obtained by dividing E by D shown in FIG. 14.

As shown in FIG. 14, by using the art described in Embodiment 1 for general print output image information, most information contained in areas to be subjected to lossless compression in the continuous tone bit map image data can be contained in an index image having a limited amount of information. This is because the number of colors used in the text and vector areas contained in the general print output image information is usually not large, as shown in FIG. 6. Hence, the compression rate can be improved at very high efficiency in comparison with the related art as indicated by the lossy compression progress rate F shown in FIG. 14, by allowing numerous areas to be subjected to lossless compression in the continuous tone bit map image data to be contained in the index image.

On the other hand, even when the number of color codes (the number of colors) is set to 1024 as shown in FIG. 6, the continuous tone bit map image data cannot be covered 100%. Generally speaking, although PDL data is created using a software application in an external PC or the like, the user who creates the PDL data usually tends not to use numerous colors for texts and vectors (graphics). However, there are various cases; a case in which tone images wherein gray scale and hue changes stepwise are used; a case in which a different color is used for each dot; or a case in which a multicolor pattern typified by a color evaluation chart, such as the Macbeth chart, is used. Since numerous colors are used locally in such a case, the number of gray scales or the number of colors of the input image cannot be limited in the image compression process for the text and vector areas to be subjected to lossless compression.

Hence, in Embodiment 1, in the continuous tone bit map image data, a photograph area which contains numerous colors and whose compression rate is hardly expected to be improved by lossless compression is first segmented in data for lossy compression. Then, the remaining text and vector areas are used as areas to be subjected to lossless compression. Color histograms are created for these areas, and pixels (areas) in which colors having high frequency of occurrence are further extracted and the pixel values thereof are replaced with color codes, whereby lossless compression index image data is obtained.

In addition, the compression process according to the JBIG method is used for the lossless compression method for index image data containing pixels in which colors having high frequency of occurrence are used. The compression process according to the JBIG method is performed by using an arithmetic code compression method referred to as QMx coder as entropy coding together with numerous context classifications, and the compression rate is expected to be improved so as to be relatively high. On the other hand, a relatively large amount of process resources is required. However, the required amount of the process resources can be reduced by decreasing the number of bits per pixel by performing the compression process.

On the other hand, the lossless compression process according to the JPEG-LS method and capable of being attained without requiring relatively large amount of process resources is performed for image data in areas not contained in index image data among the text and vector areas to be subjected to lossless compression. Since main areas in which index colors are used, more specifically, areas containing edge components and the like and being hardly expected to have a high compression rate, have already been taken out to the index image, even if the compression process according to the JPEG-LS method that is hardly expected to relatively improve a compression ratio is performed for the remaining areas, the compression rate can be improved.

Furthermore, resource reduction and improvement in compression rate are attained for the photograph area by using the JPEG method serving as a lossy compression method suited for the photograph area. In the case of an image whose area is essentially and wholly constituted by a photograph area as in the case of an image obtained by a scanner or the like, the same image compression section 4 and image decompression section 6 can be used by using only the lossy compression process method.

As described above, a process method that utilizing the characteristics of a printing image having numerous objects, such as a text, a graphic and a photograph, is used in Embodiment 1. Hence, the amount of resources required for each type of process can be balanced with the improvement in compression rate while the reversibility for an area to be subjected to lossless compression is maintained.

Embodiment 2

In the above-mentioned Embodiment 1, an area to be subjected to lossless compression in continuous tone bit map image data to be compressed is segmented into two areas (index image data for lossless compression and bit map image data for lossless compression) by the image compression section 4, and lossless compression methods different from each other are used for the two areas. Hence, the amount of resources required for each type of process can be balanced with the improvement in compression rate in each type of process.

In addition to the above-mentioned configuration, it may be possible to have a configuration in which an area to be subjected to lossless compression in continuous tone bit map image data is broken down more finely, for example, the area to be subjected to lossless compression is segmented into three kinds of image data based on the frequency of occurrence of colors to be used. In this case, for example, as a first segmentation image, pixels having three colors used at the highest frequency (when the total number of colors is more than four; in this case, one color is a transparent color) or having four colors used at the highest frequency (when the total number of colors is less than four) are extracted as index colors appearing most frequently. Furthermore, 2 bits per pixel are assigned to the extracted pixels having respective colors, each assigned bit is regarded as a pixel constituting a bit plane, and each of two bit planes is compressed using the JBIG method.

Furthermore, as a second segmentation image, pixels having 255 colors used at the next highest frequency (when the total number of colors is more than 259; in this case, one color is a transparent color) or having 256 colors used at the next highest frequency (when the total number of colors is less than 259) are extracted as index colors appearing frequently. Moreover, 8 bits per pixel are assigned to the extracted pixels having respective colors, and compression is performed using the DEFLATE method while 8 bits are used as one pixel. Still further, as a third segmentation image, the pixels having the remaining colors are compressed using the JPEG-LS method. However, as the compression process for the second segmentation image, methods other than the DEFLATE method may also be used. An appropriate compression method should only be selected based on the amount resources required for the process and the compression rate in the process.

As described above, an area to be subjected to lossless compression in the continuous tone bit map image data may be segmented into three or more images, and compression methods different from one another may be used. When the area is segmented into three or more images, judgment priority at the time of the segmentation may be changed using information other than the frequency of occurrence of color, such as a flag indicating whether each color is used in a text area. When the area to be subjected to lossless compression is segmented into three or more images, as shown in FIG. 6, a covering ratio more than 80% of the area to be subjected to lossless compression can be obtained only by the first segmentation image, and most of the area to be subjected to lossless compression can be covered by the first and second segmentation images. Hence, in Embodiment 2, the compression rate can be balanced with the required amount of resources more finely.

In Embodiments 1 and 2 described above, a color histogram is created for the line data of 8 lines, and the colors (index colors) of pixels contained in index image data for lossless compression are determined based on the created color histogram. However, the method for determining the index colors is not limited to this kind of method.

For example, it may be possible that the color information of the colors used for the printer driver of the external PC has been transmitted to the image forming apparatus 100 in advance and that the image forming apparatus 100 determines the colors indicated by the received color information as index colors. Furthermore, it may also be possible that the color information of the colors used in PDL data is inserted into the PDL data and the printer driver of the external PC transmits the color information together with the PDL data to the image forming apparatus 100. In this case, the RIP process section 2 of the image process section 10 should only transmit the received color information to the image compression section 4 directly, and the image compression section 4 should only determine index colors based on the obtained color information.

In addition to the configurations according to Embodiments 1 and 2 described above, another configuration may be used additionally in which lossless compression process is performed for the entire continuous tone bit map image data to be compressed according to the designation from the user. In other words, even image data containing areas neither a text area nor a vector area is classified into index image data for lossless compression and bit map image data for lossless compression, and lossless compression is performed for each of the two kinds of image data. Hence, the reversibility of the entire image data can be obtained securely, and the degradation in image quality before and after compression process can be prevented. However, since the colors used for the pixels in a photograph area are not used for the creation of a color histogram, the photograph area is classified as the bit map image data for lossless compression. Hence, the amount of data classified as the index image data for lossless compression can be prevented from increasing, whereby the increase of the process load due to use of the first lossless compression section 46 can be reduced.

In addition, the configuration according to Embodiment 2 in which image data is classified into three kinds of data, that is, bit map image data for lossy compression, index image data for lossless compression and bit map image data for lossless compression, or the configuration according to Embodiment 1 in which image data is classified into two kinds of data, that is, index image data for lossless compression and bit map image data for lossless compression may be selected by switching according to the designation from the user. For example, when the user issues a print request from the external PC to the image forming apparatus 100 and the user selects "lossy compression prohibition" or "high quality" through the printer driver, image data may be classified into two kinds of data. On the other hand, when the user issues a print request and the user selects "lossy compression execution" or "ordinary compression" through the printer driver, image data may be classified into three kinds of data.

Furthermore, it may be possible that the configuration in which image data is classified into two kinds of data or the configuration in which image data is classified into three kinds of data has been registered in the image forming apparatus 100 for each user and that the configuration corresponding to the user who requests printing is used for image compression. Moreover, it may also be possible that the configuration in which image data is classified into two kinds of data or the configuration in which image data is classified into three kinds of data has been registered in the image forming apparatus 100 for each external PC and that the configuration corresponding to the external PC (PC from which the PDL data was sent) which requests printing is used for image compression. Still further, the administrator of each image forming apparatus 100 may set whether image data is classified into two or three kinds of data for each image forming apparatus 100.

Embodiment 3

In Embodiments 1 and 2 Described Above, a Configuration is described in which the image compressing apparatus and the image decompressing apparatus according to the present invention are mounted in the same image forming apparatus 100. In Embodiment 3, a configuration is described in which the image compressing apparatus according to the present invention is mounted in a PC and the image decompressing apparatus according to the present invention is mounted in the image forming apparatus.

Figure 15:
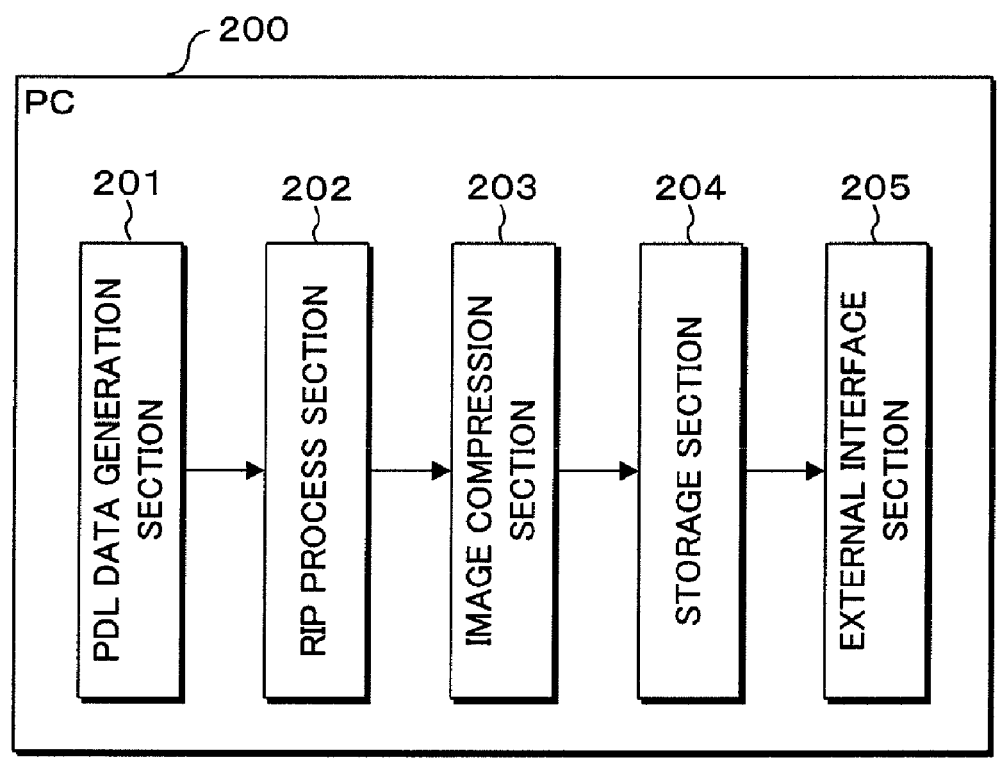
FIG. 15 is a block diagram showing the configuration of the main section of a PC according to Embodiment 3.

FIG. 15 is a block diagram showing the configuration of the main section of a PC according to Embodiment 3. A PC 200 according to Embodiment 3 is equipped with a PDL data generation section 201, an RIP process section 202, an image compression section 203, a storage section 204, an external interface section 205, etc. The RIP process section 202, the image compression section 203, the storage section 204 and the external interface section 205 provided for the PC 200 according to Embodiment 3 have the same configurations as those of the RIP process section 2, the image compression section 4, the storage section 5 and the external interface section 13 provided for the image process section 10 according to Embodiment 1 described above, respectively, and perform similar process.

The PDL data generation section 201 is a printer driver, for example, and converts created data into data written in a page description language (PDL language), thereby generating PDL data. Data to be converted into the PDL data is created, for example, using a text editing function attained by executing application software, such as text editing software or image editing software, stored in advance in the hard disk of the PC 200 by the CPU of the PC 200.

The PDL data generated by the PDL data generation section 201 is subjected to RIP process at the RIP process section 202 and converted into continuous tone bit map image data. The RIP process section 202 is used to generate the continuous tone bit map image data and pixel identification information data. The two kinds of data generated by the RIP process section 202 are subjected to image compression by the process described in Embodiment 1 at the image compression section 203, and stored in the storage section 204. The compression data stored in the storage section 204 is transmitted from the external interface section 205 to the image forming apparatus 100 via a network or the like at predetermined timing.

Figure 16:
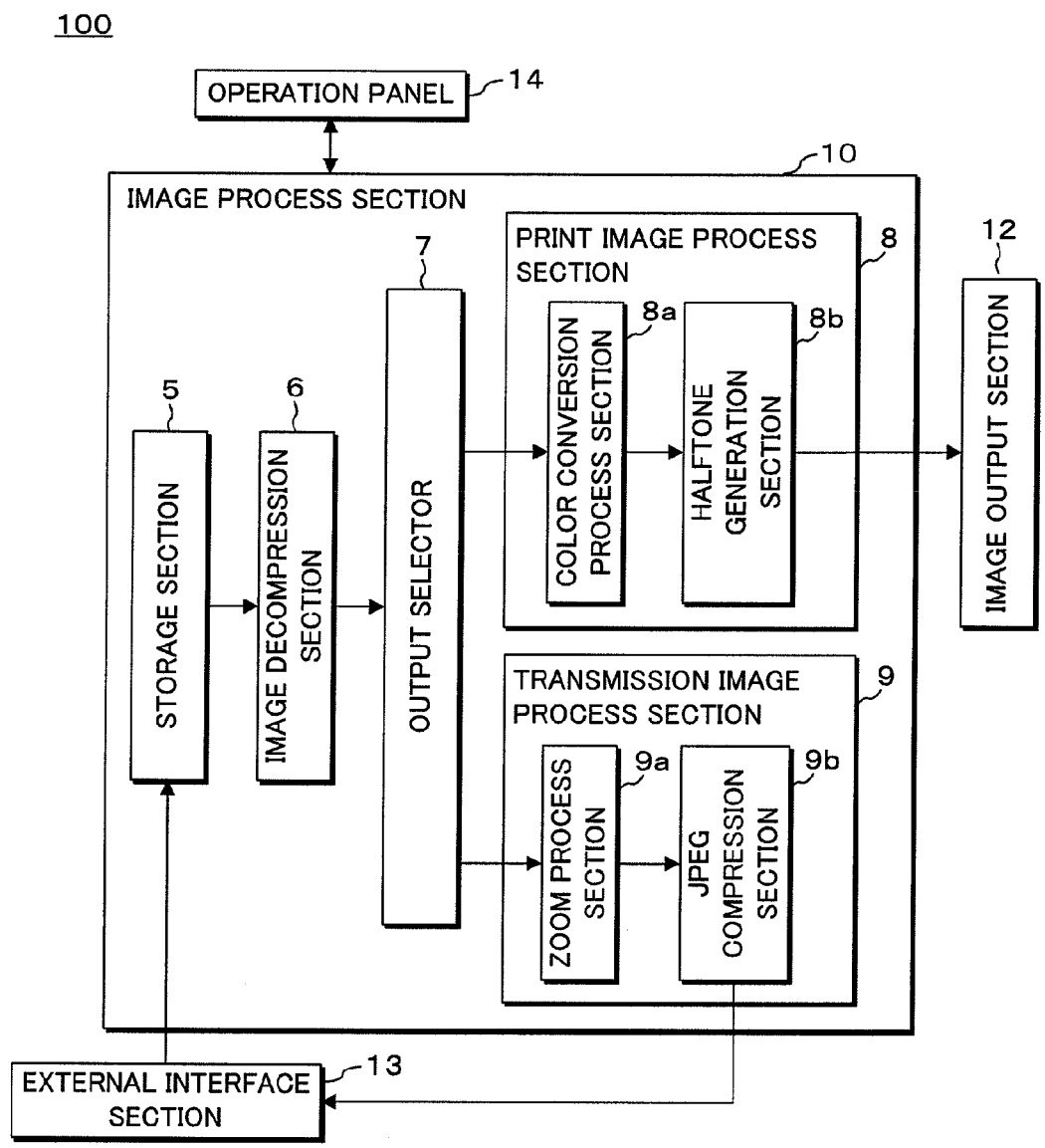
FIG. 16 is a block diagram showing the configuration of an image forming apparatus according to Embodiment 3.

FIG. 16 is a block diagram showing the configuration of an image forming apparatus 100 according to Embodiment 3. The image forming apparatus 100 (for example, a digital color printer) according to Embodiment 3 is equipped with an image process section 10, an image output section 12, an external interface section 13, an operation panel 14, etc. Furthermore, the image process section 10 according to Embodiment 3 is equipped with a storage section 5, an image decompression section 6, an output selector 7, a print image process section 8, a transmission image process section 9, etc. The image forming apparatus 100 according to Embodiment 3 has a configuration similar to that of the image forming apparatus 100 according to Embodiment 1 described above, and performs similar process. However, the image forming apparatus 100 according to Embodiment 3 is not equipped with the image input section 11 provided for the image forming apparatus 100 according to Embodiment 1 described above, and the image process section 10 according to Embodiment 3 is not equipped with the scanner image process section 1, the RIP process section 2, the input selector 3 and the image compression section 4 provided for the image process section 10 according to Embodiment 1 described above.

When the image forming apparatus 100 according to Embodiment 3 receives compressed data from the external PC 200 via the external interface section 13, the image forming apparatus 100 stores the received compressed data in the storage section 5. The compressed data stored in the storage section 5 is read out by the image decompression section 6 in the subsequent stage, and decompressed using process similar to that described in Embodiment 1.

As described above, when data subjected to image compression by the PC 200 is subjected to image decompression by the image forming apparatus 100, since the amount of data to be transmitted from the PC 200 to the image forming apparatus 100 can be reduced, the communication load on the network can be reduced. In addition, the process load on the image forming apparatus 100 can also be reduced by distributing compression process and decompression process to the PC 200 and the image forming apparatus 100.

On the other hand, it is conceivable that the compressed data stored in the storage section 5 of the image forming apparatus 100 is transmitted to the external PC 200 via the external interface section 13 and reused by the PC 200.

Hence, the PC 200 may be further equipped with the function of the image decompression section 6 of the image forming apparatus 100 in addition to the configuration shown in FIG. 15. Furthermore, it is conceivable to use a configuration in which the PC 200 does not perform compression process but performs only decompression process for the compressed data received from the image forming apparatus 100. In this case, it may be possible that the PC 200 is equipped with neither the RIP process section 202 nor the image compression section 203 shown in FIG. 15, but is equipped with only the function of the image decompression section 6 of the image forming apparatus 100.

In the respective embodiments described above, the components including the image compression sections 4 and 203 and the image decompression section 6 provided for the image forming apparatus 100 or the PC 200 may be embodied by hardware logic or may be embodied by software using a processor, such as a CPU or an MPU. In other words, the image forming apparatus 100 is equipped with a CPU for executing the instructions of control programs for accomplishing various functions, a ROM for storing the control programs, a RAM (random access memory) to which various kinds of control programs are loaded, a storage unit (recording medium), such as a memory, for storing various kinds of control programs and various kinds data, etc.

The object of the present invention is also attained by supplying, to the image forming apparatus 100, a recording medium on which the program codes (executable programs, intermediate code programs and source programs) of control programs for accomplishing various functions are recorded and which can be read by computers, and by allowing the image forming apparatus 100 (CPU pr MPU) to read and execute the programs codes recorded on the recording medium. In this case, the recording medium on which the computer programs for accomplishing the image compression method or the image decompression method according to the present invention can be provided so as to be portable.

The recording medium may be a memory, not shown, intended for microcomputer process, for example, a program medium, such as a ROM, or may also be a program medium that can be read when the recording medium is inserted into a program reader serving as an external storage unit, not shown.

In any case, it may be possible that the stored program codes are accessed by a microprocessor and executed, or it may be possible that the program codes are read out, and the read-out program codes are downloaded in the program storage area, not shown, of the microcomputer, and then the program codes are executed. In this case, it is assumed that the computer program for the downloading has been stored in the main apparatus in advance.

The above-mentioned program medium is a recording medium that can be separated from the main apparatus and may be a medium capable of fixedly storing computer programs. Examples of the medium may include a tape type, such as magnetic tape and cassette tape; a disc type, for example, a magnetic disk, such as a flexible disk and a hard disk, and an optical disc, such as CD-ROM, MO, MD, DVD and CD-R; a card type, such as an IC card (including a memory card) and an optical card; or a semiconductor memory, such as mask ROM, EPROM (erasable programmable read only memory), EEPROM (electrically erasable programmable read only memory) and flash ROM.

In addition, in the respective embodiments described above, since the image forming apparatus 100 and the PC 200 are configured so as to be connectable to a communication network including the Internet, the recording medium may be a medium for flexibly holding the program codes by downloading the program codes via the communication network. When the program codes are downloaded from the communication network, the program for performing the downloading may have been stored in the main apparatus in advance or installed from another recording medium.

Furthermore, the communication network is not particularly limited. For example, it is possible to use the Internet, intranet, extranet, LAN, ISDN, VAN, CATV communication network, virtual private network, telephone network, mobile communication network, satellite communication network, etc. Moreover, a transmission medium constituting the communication network is not particularly limited. For example, it is possible to use wired communication lines, such as IEEE 1394, USB, power line transmission, cable TV line, telephone line and ADSL line, or wireless communication, for example, communication using infrared rays for IrDA and remote control, Bluetooth (registered trademark), 802.11 wireless communication, HDR, mobile telephone network, satellite circuit and terrestrial digital network. The present invention can also be accomplished by computer data signals embedded in a carrier wave in which the above-mentioned program codes are embodied through electronic transmission.

Still further, the components provided for the image forming apparatus 100 are not limited to have configurations embodied by hardware logic or by software. For example, it may be possible that part of the components of the image forming apparatus 100 is embodied by hardware, and that the remaining parts thereof and the control of the hardware are embodied by software.

In the respective embodiments described above, as the image input section 11, a flat bed scanner, a film scanner, a digital camera or a mobile telephone is used, for example. Furthermore, as the image output section 12, not only a printer, but also an image display apparatus, such as a CRT display or a liquid crystal display, is used.

Although the preferred embodiments according to the present invention have been described specifically, the configurations, operations, etc. thereof can be changed as necessary, and the embodiments are not limited to the above-mentioned embodiments.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. An image compressing apparatus for compressing an input image having a plurality of color components, comprising:
   a first image segmentation section for segmenting said input image into a image for lossless compression to be subjected to lossless compression and a image for lossy compression to be subjected to lossy compression, based on pixel identification information indicating that respective pixels constituting said input image belong to which of a plurality of areas including a text area and a photograph area;
   a color determination section for determining color information that is used when said image for lossless compression is further segmented;
   a second image segmentation section for segmenting said image for lossless compression segmented by said first image segmentation section into a first image for lossless compression containing said color information determined by said color determination section and one or a plurality of second images for lossless compression excluding said first image for lossless compression; and an image compression section for performing respectively different compression process for each of said image for lossy compression segmented by said first image segmentation section, said first image for lossless compression and said second image for lossless compression segmented by said second image segmentation section.

2. The image compressing apparatus according to claim 1, further comprising:

a frequency distribution generating section for generating frequency distribution of color information of respective pixels constituting said image for lossless compression based on said image for lossless compression, wherein said color determination section determines the color information indicating a predetermined number of colors whose frequency of occurrence is higher, based on the frequency distribution generated by said frequency distribution generating section.

3. The image compressing apparatus according to claim 1, wherein said color determination section determines the color information for respective predetermined areas in said input image.

4. The image compressing apparatus according to claim 1, wherein said first image segmentation section segments said input image into said image for lossless compression and said image for lossy compression according to a predetermined condition.

5. The image compressing apparatus according to claim 1, wherein said second image segmentation section generates said first image for lossless compression by replacing a pixel value of a pixel included in a pixel constituting said image for lossless compression segmented by said first image segmentation section and segmented into said second image for lossless compression with a pixel value indicating a transparent color.

6. An image compressing method for compressing an input image having a plurality of color components, comprising:

a first image segmentation step for segmenting said input image into a image for lossless compression to be subjected to lossless compression and a image for lossy compression to be subjected to lossy compression, based on pixel identification information indicating that respective pixels constituting said input image belong to which of a plurality of areas including a text area and a photograph area;

a color determination step for determining color information that is used when said image for lossless compression is further segmented;

a second image segmentation step for segmenting said image for lossless compression segmented at said first image segmentation step into a first image for lossless compression containing said color information determined at said color determination step and one or a plurality of second images for lossless compression excluding said first image for lossless compression; and an image compression step for performing respectively different compression process for each of said image for lossy compression segmented by said first image segmentation step, said first image for lossless compression and said second image for lossless compression segmented by said second image segmentation step.

7. An image decompressing apparatus for decompressing a compressed image, comprising:

an image decompression section for performing respectively different decompression process for a lossy compression image subjected to lossy compression after segmented from one image, and a plurality of lossless compression images each subjected to different types of lossless compression after segmented from said one image; and an image composing section for composing a plurality of images obtained by performing the different types of decompression process by said image decompression section, by superimposing the plurality of images in a predetermined sequence.

8. An image decompressing method for decompressing a compressed image, comprising:

an image decompression step for performing respectively different decompression process for a lossy compression image subjected to lossy compression after segmented from one image, and a plurality of lossless compression images each subjected to different types of lossless compression after segmented from said one image; and an image composing step for composing a plurality of images obtained by performing the different types of decompression process at the image decompression step, by superimposing the plurality of images in a predetermined sequence.

9. An image forming apparatus comprising:

said image decompressing apparatus according to claim 7; and an image forming section for forming an output image based on an image processed by said image decompressing apparatus.

10. An image forming apparatus comprising:

said image compressing apparatus according to claim 1;

an image decompressing apparatus including an image decompression section for performing respectively different decompression process for a lossy compression image subjected to lossy compression after segmented from one image, and a plurality of lossless compression images each subjected to different types of lossless compression after segmented from said one image; and an image composing section for composing a plurality of images obtained by performing the different types of decompression process by said image decompression section, by superimposing the plurality of images in a predetermined sequence; and an image forming section for forming an output image based on the image processed by said image decompressing apparatus, wherein said image decompressing apparatus performs decompression process for an image compressed by said image compressing apparatus.

11. A non-transitory computer readable medium on which a computer program for causing a computer to perform compression process for an input image having a plurality of color components are recorded so as to be readable by said computer, said computer programs comprising:

a first image segmentation step for causing said computer to segment said input image into a image for lossless compression to be subjected to lossless compression and a image for lossy compression to be subjected to lossy compression, based on pixel identification information indicating that respective pixels constituting said input image belong to which of a plurality of areas including a text area and a photograph area;

a color determination step for causing said computer to determine color information that is used when said image for lossless compression is further segmented;

a second image segmentation step for causing said computer to segment said image for lossless compression segmented at said first image segmentation step into a first image for lossless compression containing said color information determined at said color determination step and one or a plurality of second images for lossless compression excluding said first image for lossless compression; and an image compression step for causing said computer to perform respectively different compression process for each of said image for lossy compression segmented by said first image segmentation step, said first image for lossless compression and said second image for lossless compression segmented by said second image segmentation step.

12. A non-transitory computer readable medium on which computer programs for causing a computer to perform decompression process for a compressed image are recorded so as to be readable by said computer, said computer programs comprising:

an image decompression step for causing said computer to perform respectively different decompression process for a lossy compression image subjected to lossy compression after segmented from one image, and a plurality of lossless compression images each subjected to different types of lossless compression after segmented from said one image; and an image composing step for causing said computer to compose a plurality of images obtained by the different types of decompression process at said image decompression step by superimposing the plurality of images in a predetermined sequence.

* * * * *